United States Patent
Takekawa et al.

(10) Patent No.: US 7,600,228 B2
(45) Date of Patent: Oct. 6, 2009

(54) INFORMATION PROCESSING DEVICE AND INFORMATION PROCESSING TERMINAL

(75) Inventors: Hiroshi Takekawa, Tokyo (JP); Hisashi Takayama, Tokyo (JP); Hayashi Ito, Matsudo (JP); Tsuyoshi Sakata, Melrose Park (SG); Hiroshi Nishikawa, Kawasaki (JP)

(73) Assignee: Panasonic Corporation, Osaka (JP)

( * ) Notice: Subject to any disclaimer, the term of this patent is extended or adjusted under 35 U.S.C. 154(b) by 474 days.

(21) Appl. No.: 10/890,631

(22) Filed: Jul. 14, 2004

(65) Prior Publication Data

US 2005/0015275 A1    Jan. 20, 2005

(30) Foreign Application Priority Data

Jul. 15, 2003 (JP) ............... P. 2003-274841
May 11, 2004 (JP) ............... P. 2004-140908

(51) Int. Cl.
*G06F 9/445* (2006.01)
*G06F 9/44* (2006.01)
*G06K 5/00* (2006.01)

(52) U.S. Cl. ............... 717/178; 717/168; 717/173; 235/380

(58) Field of Classification Search ............. 717/172, 717/178
See application file for complete search history.

(56) References Cited

U.S. PATENT DOCUMENTS 5,212,369 A * 5/1993 Karlisch et al. ............ 235/380
5,754,654 A * 5/1998 Hiroya et al. .............. 705/76
5,761,309 A * 6/1998 Ohashi et al. .............. 713/156
6,097,967 A * 8/2000 Hubbe et al. .............. 455/558
6,220,510 B1 * 4/2001 Everett et al. ............. 235/380

(Continued)

FOREIGN PATENT DOCUMENTS

JP    2003-22427    1/2003

(Continued)

OTHER PUBLICATIONS

"Shell Applications", Apr. 15, 1999, Multos Technical Bulletin, retrieved from <http://www.multos.gr.jp/library/pdf/tb001_shell_applications.pdf> pp. 1-7.*

(Continued)

*Primary Examiner*—Tuan Q Dam
*Assistant Examiner*—Marina Lee
(74) *Attorney, Agent, or Firm*—Pearne & Gordon LLP

(57) ABSTRACT

With respect to a secure device 10 for executing a data storing operation and a data calculating operation under secrecy condition, a first application program 15 and a second application program 11 are retained. The program 15 causes an information processing terminal 30 mounted thereon this secure device 10 to execute a process operation by utilizing a resource of this information processing terminal 30. The program 11 causes the secure device 10 to execute such a process operation under secrecy condition in conjunction with the process operation of this information processing terminal 30. When this secure device 10 is mounted on the information processing terminal 30, this secure device 10 loads the program 15 to the information processing terminal 30 so as to install this loaded first application program therein. Then, a terminal application program required to execute a service is automatically installed to the information processing terminal 30.

20 Claims, 31 Drawing Sheets

U.S. PATENT DOCUMENTS

| | | | |
|---|---|---|---|
| 6,353,888 B1 * | 3/2002 | Kakehi et al. | 713/168 |
| 6,359,699 B1 * | 3/2002 | Yoneta et al. | 358/1.16 |
| 6,542,594 B1 * | 4/2003 | LeBoulzec | 379/201.03 |
| 6,564,995 B1 * | 5/2003 | Montgomery | 235/379 |
| 6,644,553 B1 * | 11/2003 | Ohki et al. | 235/492 |
| 6,659,345 B2 * | 12/2003 | Sukeda et al. | 235/382 |
| 6,707,892 B2 * | 3/2004 | Kawagishi | 379/93.05 |
| 6,766,961 B2 * | 7/2004 | Hosogoe et al. | 235/492 |
| 7,003,663 B2 * | 2/2006 | Lagosanto et al. | 713/159 |
| 7,047,558 B1 * | 5/2006 | Mariana | 726/3 |
| 7,140,549 B2 * | 11/2006 | de Jong | 235/492 |
| 7,387,258 B2 * | 6/2008 | Potonniee et al. | 235/492 |
| 2002/0144254 A1 * | 10/2002 | Owada | 717/171 |
| 2002/0156802 A1 * | 10/2002 | Takayama et al. | 707/500 |
| 2003/0114144 A1 * | 6/2003 | Minemura | 455/410 |

FOREIGN PATENT DOCUMENTS

| | | |
|---|---|---|
| JP | 2003-141457 | 5/2003 |

OTHER PUBLICATIONS

Deville et al. "Smart Card Operating Systems: Past, Present and Future", Retrieved from <http://www.gemplus.com/smart/rd/publications/pdf/DGGJ03os.pdf>, Feb. 10-14, 2003, pp. 1-18.*

* cited by examiner

FIG. 4

SELECT APPLICATION PROGRAM
TO BE INSTALLED

◇ ELECTRONIC MONEY

◇ POINT SERVICE

| INSTALL | CANCEL |

FIG. 8

ENTER LICENCE CODE OF ELECTRONIC MONEY APPLICATION PROGRAM, AND THEN SELECT "OK"

LICENCE CODE:

[ OK ]  [ CANCEL ]

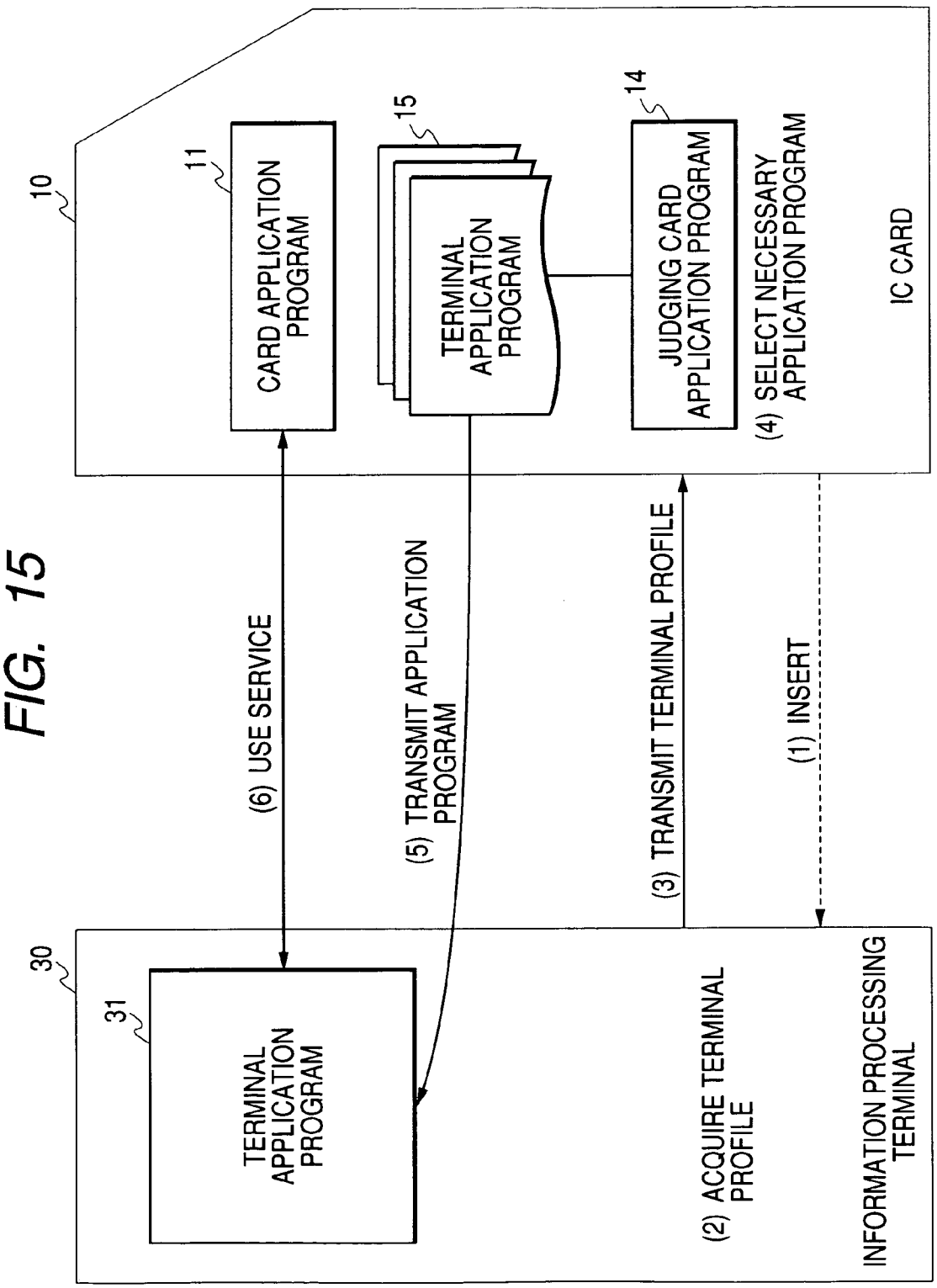

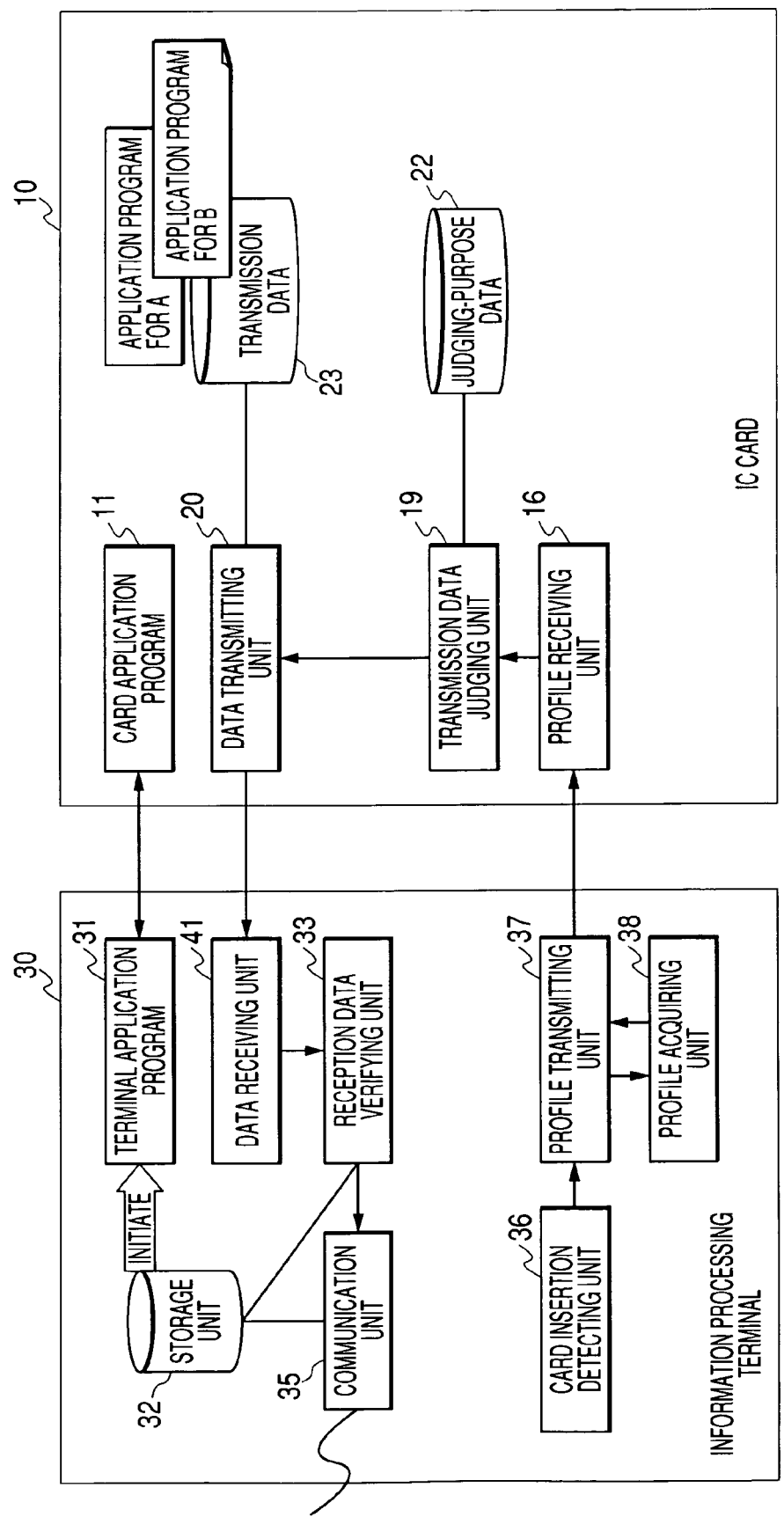

FIG. 17(a)

ID: 38FE971D
Type: A
Model1: ABC-03
Memory: 16k bytes free

FIG. 17(b)

A: APPLICATION PROGRAM FOR A, ver.3, until 03/12/31, http://a/app.new
B: APPLICATION PROGRAM FOR B, ver.2, until 04/03/31, http://b/app.new

FIG. 31

```
# Type: Mode1: DRM: Service
ALL: ALL: DRM-A: Song-1
A: ALL: DRM-A, DRM-B: Song-2
A: ABC-01: DRM-C: Song-3
B: ALL: !DRM-D: Movie-1
```

INFORMATION PROCESSING DEVICE AND INFORMATION PROCESSING TERMINAL

BACKGROUND OF THE INVENTION

1. Field of the Invention

The present invention is related to both an information processing device such as a IC card capable of retaining data in a secure manner, and also an information processing terminal such as a portable telephone, a PDA (Personal Digital Assistant), and a personal computer, which mount thereon the above-explained information processing device.

2. Description of the Related Art

Very recently, secure devices such as IC cards have been utilized in various fields, for example, electronic money, commuter passes, electronic tickets, and the like. Currently, since very fine processing technical ideas are improved, such memories having relatively large storage spaces have been manufactured. Since IC cards (will be referred to as "IC cards" hereinafter which contain various sorts of secure devices) equipped with such large storage memories are capable of storing thereinto a plurality of application programs at the same time, a single piece of such an IC card may be utilized in plural sorts of utilization fields.

While this IC card is mounted on such an information processing terminal as a portable telephone and the like, since either a keyboard or a display of the information processing terminal is used as a user interface with respective to the IC card, or since either data which is written into the IC card or data which has been read out from the IC card is transmitted onto a network by utilizing a communication function of the information processing terminal, various sorts of services can be carried out.

However, in order to execute such various services, a terminal application program is necessarily required to be installed in the information processing terminal, while this terminal application program defines operations which should be executed by this information processing terminal when the above-explained services are carried out.

Conventionally, information processing terminals acquire the above-described terminal application program by downloading this terminal application program via a network from service providers.

For instance, the below-mentioned patent publication 1 (Japanese Laid-open Patent Application No. 2003-141457) discloses such an information processing terminal 30 which downloads from a service provider, a terminal application program capable of displaying value information such as an electronic money and an electronic ticket, which have been stored in an IC card, even under off-line environment. That is, as shown in FIG. 21, this information processing terminal 30 is provided with an application URL input unit 34, a communication unit 35, a reception data verifying unit 33, and a storage unit 32. The application URL input unit 34 is used to input a URL (Uniform Resource Locator) of a service provider. The communication unit 35 is communicated to the service provider. The reception data verifying unit 33 verifies the reception data. The storage unit 32 stores thereinto a received terminal application program 31. On the other hand, an IC card 10 is equipped with a non-contact communication unit 13, and a card application program 11. The non-contact communication unit 13 transfers/receives value formation between a reader/writer 50 and the IC card 10. The card application program 11 defines operations of the IC card 10 which should be carried out when a request issued from the terminal application program 31 is received. It should be understood that reference numerals which are circled indicate sequences of operations (this is similarly applied to below-mentioned drawings).

In order to view the value information 12 stored in this IC card 10 by employing the information processing terminal 30 under off-line environment, a user inputs the URL of the terminal application program 31 which has been stored in the server 40 of the service provider into the application URL input unit 34. The application URL input unit 34 transfers this entered URL to the communication unit 35 (1), and the communication unit 35 receives the terminal application program 32 from the server 40 based upon the transferred URL, and then, transfers the received terminal application program 31 to the reception data verifying unit 33 (2). The reception data verifying unit 33 executes verification of the terminal application program 31, and then, if there is no problem, then the reception data verifying unit 33 stores the verified terminal application program 31 into the storage unit 32 (3).

This terminal application program 31 is initiated by an operation of the user, and then, requests the value information 12 to the card application 11 of the IC card 10 mounted on the information processing terminal 30. The card application program 11 reads out the stored value information 12, and then transmits the read value information 12 to the information processing terminal 30 (4). The terminal application program 31 executes such a process operation that the acquired value information 12 is displayed on a display unit of the information processing terminal 30.

Also, the below-mentioned patent publication 2 (Japanese Laid-open Patent Application No. 2003-22427) discloses a recording device (MultiMedia Card: registered trademark of InfineonTechnologies AG in Germany) which is mounted on an information processing terminal. That is, when a new function is additionally provided with this recording device, the recording device is equipped with an upload module of a driver program in order that this function can be used by the information processing terminal.

In order to use the function of the above-described IC card in an information processing terminal, a terminal application program for a service purpose corresponding to the IC card must have been installed on the side of the information processing terminal. In such a case that the terminal application program for the service purpose has not yet been installed in the information processing terminal, in the conventional format, a series of such operations are required to be carried out. That is, in this conventional format, a check is made of a location where the terminal application program corresponding to the machine sort of this information processing terminal can be downloaded, a user inputs the URL thereof and the like into the information processing terminal so as to download the terminal application program, and thus, the user installs this downloaded terminal application program in this information processing terminal. Since the above-described series of these operations cause users to perform the cumbersome operations, in such a case that a certain user does not become skilled in operations of an information processing terminal, there are some possibilities that this user cannot install the terminal application program, and thus, finally, cannot utilize the function of the IC card.

Also, in the case that the information processing terminal is a portable telephone, there is such a problem that a telephone communication fee is required when the terminal application program is downloaded to this portable telephone.

Also, in such a case that the above-described MultiMedia Card owns the IC card function for executing the card application program, in order that the function of the card application of the MultiMedia Card is used by the information processing terminal, the updating operation of the driver program by the conventional technique cannot give satisfactory utilization, and therefore, the terminal application program for the service purpose, which corresponds to this card application program, must be installed in the information processing terminal.

When a new function is added, there are many cases that a terminal application program for a service purpose as to this newly added function is newly required. As a consequence, in the conventional format, the following problems occur. That is, a user himself of an information processing terminal must select such a terminal application program which corresponds to the machine sort of this information processing terminal and must install this selected terminal application program; the user can hardly judge that what sort of terminal application program is selected; and the user must perform a similar cumbersome operation to the above-explained operation. Although there is such a method that a certain program operated on the information processing terminal may judge this proper terminal application program, an installing operation of the terminal application program to the information processing information depends upon the program operated on the information processing terminal in this case. Thus, there is another problem that a confirming operation as to a license to the use of this terminal application program cannot be carried out in a safety manner, namely, an issuing person of the terminal application program cannot control the use of the terminal application program.

SUMMARY OF THE INVENTION

The present invention has been made to solve the problems of the conventional techniques, and therefore, has an object to provide such as information processing device that the information processing device can be carried out by an information processing terminal in an easy manner without acquiring an application program from an external source. Also, another object of the present invention is to provide an information processing terminal for executing a service while this information processing device is mounted thereon.

An information processing device, according to the present invention, is featured by such an information processing device for responding to a request issued from an information processing terminal, comprising: retaining means for retaining both a first application program for causing the information processing terminal to execute a process operation and a second application program for causing the information processing device to execute a process operation; and transmission means for transmitting the first application program to the information processing terminal in response to the request.

In accordance with the above-explained arrangement, since the first application program for causing the information processing terminal to execute the process operation is retained, the first application program can be transmitted to the information processing terminal in response to the request issued from the information processing terminal. As a result, the information processing device can be readily executed by the information processing terminal, while the user need not perform such an operation for acquiring an application program from an external source.

Also, in the information processing device of the present invention, when the information processing device is mounted on the information processing terminal, the transmission means transmits the first application program.

As a result, the terminal application program required to execute a service can be automatically loaded to the information processing terminal.

Also, in the information processing device of the present invention, the transmission means selects the first application program to be transmitted in response to a condition.

As a result, terminal application programs which are adapted to various sorts of conditions are loaded with respect to the information processing terminal.

Also, in the information processing device of the present invention, the transmission means selects the first application program to be transmitted in response to the information processing terminal.

As a result, a terminal application program which is adapted to an information processing terminal is loaded with respect to this information processing terminal.

Also, in the information processing device of the present invention, the transmission means selects the first application program to be transmitted in response to a terminal profile acquired from the information processing terminal.

As a result, a terminal application program which is adapted to the information processing terminal is loaded based upon the terminal profile of the information processing terminal.

Also, in the information processing device of the present invention, the transmission means selects the first application program to be transmitted in response to machine sort information which is contained in the terminal profile.

As a consequence, a terminal application program which is adapted to the machine sort of the information processing terminal is loaded.

Also, in the information processing device of the present invention, the transmission means selects the first application program to be transmitted in response to an empty storage capacity which is contained in the terminal profile.

As a consequence, a terminal application program which can be stored in the information processing terminal is loaded.

Also, in the information processing device of the present invention, the transmission means selects the first application program to be transmitted in response to presence/absence of a license related to the first application program.

As a result, it is possible to avoid that such a terminal application program having no license is loaded.

Also, in the information processing device of the present invention, the transmission means selects the first application program to be transmitted in response to an input of a license code related to the first application program.

As a result, it is possible to avoid that such a terminal application program having no license is loaded.

Also, in the information processing device of the present invention, the information processing device is further comprised of: providing means for selectably providing on the information processing terminal, a list of process operations which can be executed by using a resource of the information processing terminal; and in which when the information processing device is mounted on the information processing terminal, the transmission means selects such a first application program used to execute a process operation selected from the list.

As a consequence, the terminal application program of the service which is selected by the user is loaded to the information processing terminal.

Also, in the information processing device of the present invention, the transmission means transmits information as to an acquisition destination for acquiring a latest version of the first application program to the information processing terminal in combination with the first application program.

As a result, in the case that a version of a terminal application program received by the information processing terminal is old, this information processing terminal can readily acquire the latest version of the terminal application program.

Also, in the information processing device of the present invention, the information processing device is further comprised of: conversion means for converting a protection format of the selected first application program based upon the terminal profile; and in which the transmission means transmits the converted first application program.

As a consequence, the protected application program can be utilized by a plurality of information processing terminals respectively, which employ the different protection formats from each other, since the protected application program is received via the information processing device.

Also, in the information processing device of the present invention, the retaining means retains data which is used by the first application program; and the transmission means transmits the data which is used by the first application program in combination with the first application program.

As a consequence, both the terminal application program and the data, which are required to execute the service, are automatically loaded to the information processing terminal.

Also, an information processing terminal, according to the present invention, is featured by such an information processing terminal which is communicated to an information processing device, comprising: requesting means for requesting the information processing device to acquire a first application program which is used to execute a process operation by the information processing terminal; acquisition means for acquiring the first application program which is transmitted from the information processing device in response to the request; and storage means for storing thereinto the acquired first application program.

In accordance with the above-explained arrangement, since the acquisition means for acquiring the first application program transmitted from the information processing device in response to the request is provided, the information processing device can be easily executed by the information processing terminal, while the user need not perform the operation for acquiring the application program from the external source.

Also, in the information processing terminal of the present invention, the requesting means senses an insertion of the information processing device to issue the request. Also, in the information processing terminal of the present invention, the requesting means senses that the information processing device is located in a predetermined range to issue the request. Also, in the information processing terminal of the present invention, the information processing terminal is further comprised of: initiation means for initiating the first application program by sensing that the first application program is acquired. Also, in the information processing terminal of the present invention, the acquisition means acquires information as to an acquisition destination used to acquire a latest version of the first application program in combination with the first application program. Furthermore, in the information processing terminal of the present invention, the acquisition means acquires data which is used by the first application program in combination with the first application program.

In accordance with the present invention, since the information processing device retains the application program for causing the information processing terminal to execute the process operation, this application program can be transmitted to the information processing terminal in response to the request issued from the information processing terminal. As a result, the information processing device can be readily executed by the information processing terminal, while the user need not perform such an operation for acquiring the application program from the external source.

BRIEF DESCRIPTION OF THE DRAWINGS

FIG. 4 is a diagram for indicating a service list display screen in the first embodiment mode of the present invention;

FIG. 8 is a diagram for indicating a license input screen in the first embodiment mode of the present invention;

FIG. 15 is a diagram for schematically representing a process sequential operation executed between a secure device and an information processing terminal, according to a second embodiment mode of the present invention;

FIG. 16 is a diagram for showing a functional block as to the secure device and the information processing terminal, in the second embodiment mode of the present invention;

FIG. 17a indicates an example of a terminal profile in the second embodiment mode of the present invention, and FIG. 17b shows an example of judging data in the second embodiment mode of the present invention;

FIG. 31 is a diagram for indicating a data example as to service data.

Figure 1:
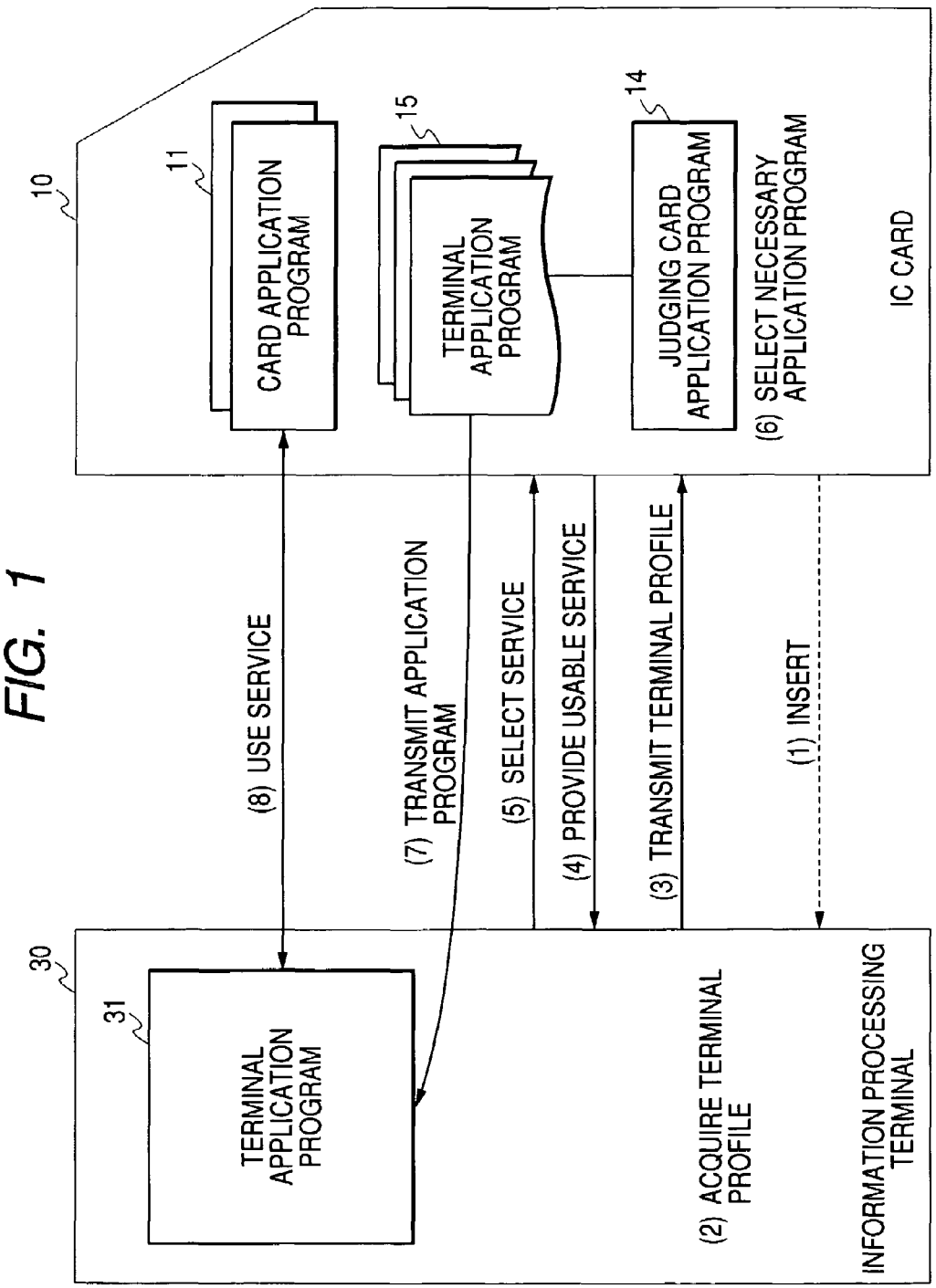
FIG. 1 is a diagram for schematically showing a process sequential operation between a secure device and an information processing terminal, according to a first embodiment mode of the present invention.

In the drawings, a reference numeral 10 refers to an IC card; 11 to a card application program; 12 to a value information; 13 to a non-contact communication unit; 14 to a judging card application program; 15 to a terminal application program; 16 to a profile receiving unit; 17 to an usable service judging unit; 18 to a service list transmitting unit; 19 to a transmission data judging unit; 20 to a data transmitting unit; 21 to a service data; 22 to a judging-purpose data; 23 to a transmission data; 24 to a balance information; 25 to an use history information; 26 to a card OS; 27 to a CPU; 28 to an host I/F; 29 to a storage area; 30 to an information processing terminal; 31 to a terminal application program; 32 to a storage unit; 33 to a reception data verifying unit; 34 to an application URL input unit; 35 to a communication unit; 36 to a card insertion detecting unit; 37 to a profile transmitting unit; 38 to a profile acquiring unit; 39 to a service list receiving unit; 40 to a service selecting unit; 41 to a data receiving unit; 42 to a display unit; 43 to a selecting unit; 45 to an user; 46 to an OS/driver; 47 to an IC card I/F; 49 to an automatic loading application program; 50 to a reader/writer; 60 to a data converting unit; 61 to a protection format converting engine; 62 to an interpreter; 63 to a formatter; 70 to a contents; 71 to a license; 72 to a protected contents; 80 to a data transmitting unit; 81 to a data receiving unit; 90 to a decoding unit; 100 to a judging card application program; 110 to a secure memory card; 111 to a card-sided electronic money application program; 120 to a control unit; 130 to an internal CPU; 140 to a TRM; 141 to an internal non-volatile memory; 150 to a large capacity non-volatile memory; 151 to a secure area; 160 to an external CPU; 211 to a license managing application program; 212 to a license information; 230 to a format data; 312 to a terminal-sided electronic money application program; 320 to a storage area; 321 to a game application program for B; 350 to a communication module; and 411 to a protection format converting application program.

DETAILED DESCRIPTION OF THE PREFERRED EMBODIMENTS

In the following embodiments, a secure device which is an IC card, a secure memory card or such, is explained as an example of an information processing device.

Regarding a information processing terminal, in the embodiments, a portable telephone, a portable information terminal (PDA), a personal computer, a music reproducing (and recording) device, a camera, a video camera, an automatic cash dispenser, a street-installed terminal, a settlement terminal, and the like are envisioned.

First Embodiment Mode

In a first embodiment mode of the present invention, a description is made of a secure device such as an IC card and the like, which retains a terminal application program corresponding to a plurality of services. When this secure device is mounted on an information processing terminal, services which can be used in this information processing terminal are displayed on the information processing terminal in a list form, a terminal application program of such a service which is selected from the service list is loaded from the secure device to the information processing terminal, and then, the loaded terminal application is installed to the information processing terminal, so that this installed terminal application program is brought into the usable condition.

FIG. 1 roughly and illustratively shows a sequential operation executed in the case that a terminal application program 31 is loaded from this IC card 10 to an information processing terminal 30.

The IC card 10 contains a card application program 11, a plurality of terminal application programs 15, and a judging card application program 14. The card application program 11 causes the information processing terminal 30 to execute a process operation and to realize secure processing functions of various services which are carried out in conjunction with the terminal application programs 15. The plural terminal application programs 15 are employed by the information processing terminal 30 so as to execute process operations. The judging card application 14 selects the plural terminal application programs 15. The terminal application programs 15 contains various sorts of services, and various sorts of application programs corresponding to various machine sorts of the information processing terminals 30.

When the IC card 10 is inserted into the information processing terminal 30 (1), the information processing terminal 30 which has detected mounting of this IC card 10 acquires a terminal profile (2), and then transmits the acquired terminal profile to the IC card 10 (3). This terminal profile contains information such as a machine sort, an empty storage capacity of a memory, and the like. While the IC card 10 displays a list of services which can be utilized by this machine sort on the information processing terminal 30 (4), when a service is selected (5), the judging card application program 14 of the IC card 10 selects such a terminal application program 15 which is adapted to the information processing terminal 30 based upon the terminal profile (6), and then transmits the selected terminal application program 15 to the information processing terminal 30 (7). A terminal application program 31 which is loaded to the information processing terminal 30 is initiated so as to commence a communication with the card application program 11, and also execute a service by utilizing a resource of the information processing terminal 30.

Figure 2:
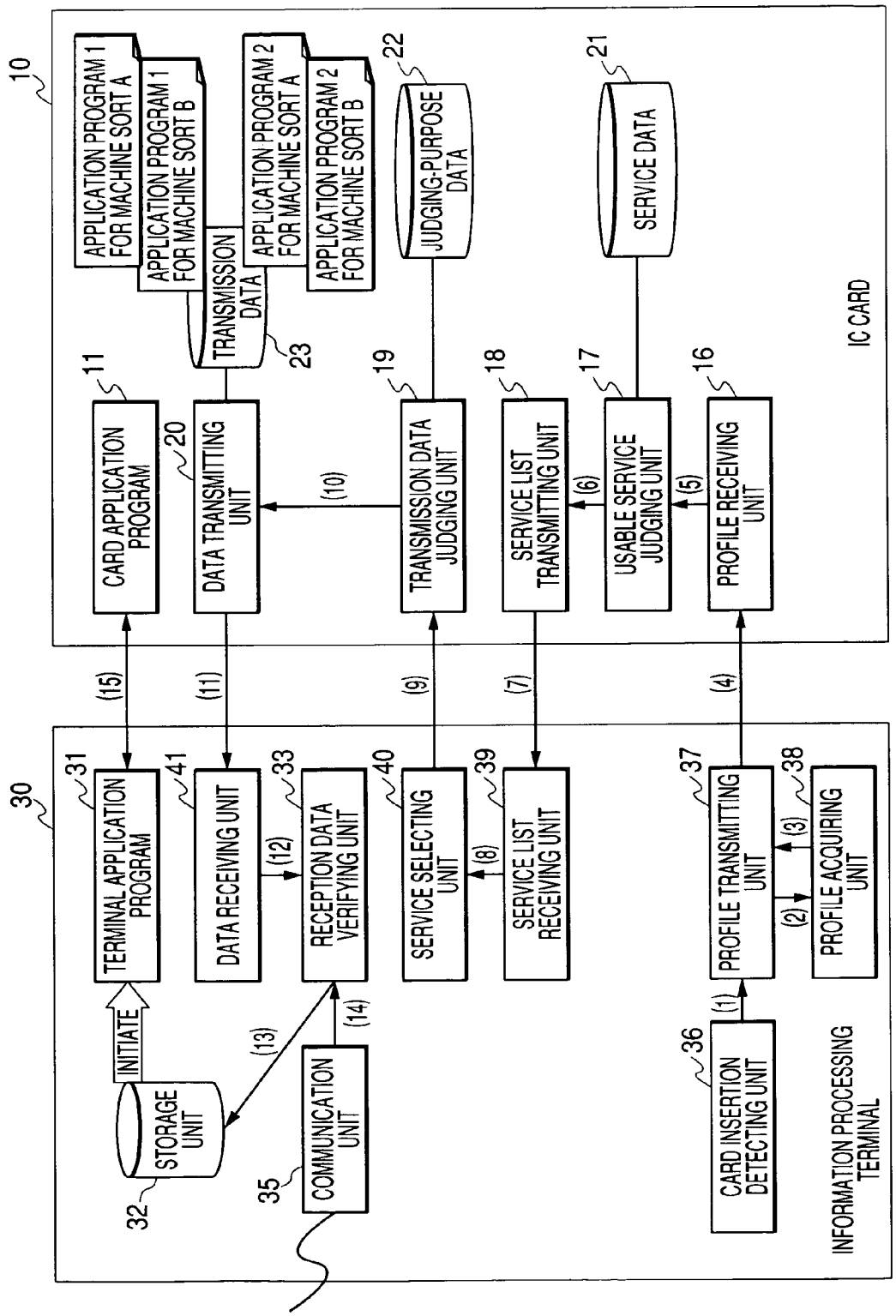
FIG. 2 is a diagram for indicating a functional block as to the secure device and the information processing terminal, according to the first embodiment mode of the present invention.

FIG. 2 is a diagram for representing a structure of this IC card 10 and an arrangement of the information processing terminal 30 in a block form. The IC card 10 is equipped with a card application program 11, service data 21, judging-purpose data 22, and transmission data 23. In the service data 21, such services have been described which can be utilized every machine sort and model of the information processing terminal 30. The judging-purpose data 22 is used so as to discriminate a terminal application which is adapted to the information processing terminal 30. Also, terminal application programs, storage capacity sizes, and the like, which correspond to various services, have been described in the judging-purpose data 22. The transmission data 23 contains a plurality of terminal application programs. Further, the IC card 10 is equipped with a profile receiving unit 16, a usable service judging unit 17, a service list transmitting unit 18, a transmission data judging unit 19, and a data transmitting unit 20. The profile receiving unit 16 receives a terminal profile from the information processing terminal 30. The usable service judging unit 17 judges such a service which can be used by the information processing terminal 30 by employing service data 21. The service list transmitting unit 18 transmits list information of services which can be used by the information processing terminal 30. The transmission data judging unit 19 judges a terminal application program which is transmitted to the information processing terminal 30 by employing judging-purpose data 22. The data transmitting unit 20 derives the terminal application program which has been judged by the transmission data judging unit 19 from the transmission data 23, and then transmits the derived terminal application program to the information processing terminal 30.

On the other hand, the information processing terminal 30 is provided with a card insertion detecting unit 36, a profile transmitting unit 37, a profile acquiring unit 38, a service list receiving unit 39, a service selecting unit 40, a data receiving unit 41, a reception data verifying unit 33, a storage unit 32, and also, a communication unit 35. The card insertion detecting unit 36 detects mounting of the IC card 10. The profile acquiring unit 38 acquires a terminal profile of the information processing terminal 30. The profile transmitting unit 37 transmits this terminal profile to the IC card 10. The service list receiving unit 39 receives service list information from the IC card 10. The service selecting unit 40 selects a service from the received service list. The data receiving unit 41 receives the terminal application program 31 transmitted from the IC card 10. The reception data verifying unit 33 verifies the received terminal application program 31. The storage unit 32 stores thereinto such a terminal application program 31 which has no problem based upon a verification result. In such a case that a version of a terminal application program received from the IC card 10 has been updated, the communication unit 35 acquires the latest version of the terminal application program from a service provider.

When the card insertion detecting unit 36 of the information processing terminal 30 detects an insertion of the IC card 10, the card insertion detecting unit 36 informs this card insertion detecting result to the profile transmitting unit 37 (1). When the card insertion is informed, the profile transmitting unit 37 requests the profile acquiring unit 38 to acquire a terminal profile (2). Then, the profile acquiring unit 38 acquires the terminal profile, and returns the acquired terminal profile to the profile transmitting unit 37 (3).

The terminal profile corresponds to such information as to the information processing terminal 30. In this case, as represented in (a) of FIG. 3, it is so assumed that information as to a machine sort (Type), a model number (Model), and an empty storage capacity (Memory) for an application program of an information processing terminal is contained in this terminal profile. Also, it is so assumed that as to the terminal profile of the subject information processing terminal 30, the machine sort is A; the model number is ABC-01; and the empty storage capacity is 32 kilo-bytes.

When the profile transmitting unit 37 receives a terminal profile, the profile transmitting unit 37 transmits the received terminal profile to the profile receiving unit 16 of the IC card 10 (4). The profile receiving unit 16 transfers the received terminal profile to the usable service judging unit 17 (5). Then, the usable service judging unit 17 selects a list of the usable services on the information processing terminal 30 by employing both the terminal profile and the service data 21.

Figure 3:
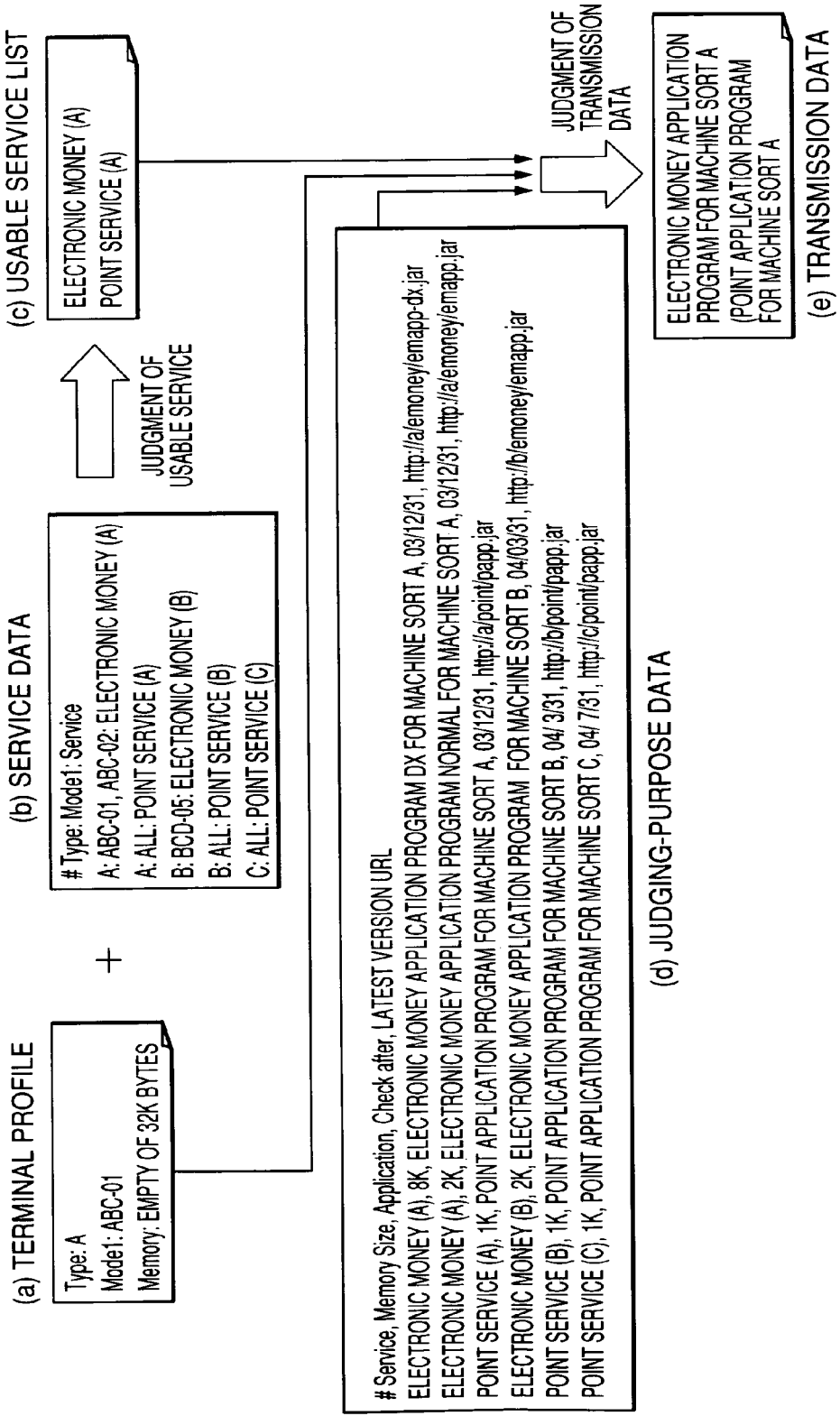
FIG. 3 is a diagram for indicating a judging sequential operation of transmission data in the first embodiment mode of the present invention.

As indicated in (b) of FIG. 3, while various sorts of services corresponding to machine sorts and model numbers have been described, the usable service judging unit 17 selects such a service (electronic money (A), and point service (A)) which can be used by the information processing terminal 30 defined by the machine sort A and the model number ABC-01. Then, the usable service judging unit 17 transfers a list of this usable service (see (c) of FIG. 3) to the service list transmitting unit 18 (6).

The service list transmitting unit 18 transmits the service list to the service list receiving unit 39 of the information processing terminal 30 (7). The service list receiving unit 39 transfers the service list to the service selecting unit 40 (8). The service selecting unit 40 selects a service, and then, transmits the selected service information to the transmission data judging unit 19 of the IC card 10 (9). At this time, as shown in FIG. 4, while the service list may be alternatively displayed on the screen of the information processing terminal 30, a user may select a desirable service. In this case, it is so assumed that an "electronic money (A)" service is selected by the user (it should also be noted that user may alternatively select both "electronic money (A)" and "point service (A)").

When the transmission data judging unit 19 receives the service information, this transmission data judging unit 19 judges such a data (terminal application program) which should be transmitted to the information processing terminal 30 by employing the judging-purpose data 22.

As shown in (d) of FIG. 3, a service name (Service), a storage capacity size (Memory size) which is required to install a relevant terminal application, a name (Application) of the terminal application program, a confirmation day/time (Check after) of the latest version thereof, and a URL (latest version URL) used to acquire the latest version have been described in the judging-purpose data 22. In this case, the transmission data judging unit 19 refers to data related to such a terminal application program that the service name of this judging-purpose data 22 corresponds to "electronic money (A)", and judges as to whether or not a storage capacity size (Memory size) which is required to install the terminal application program is smaller than, or equal to an empty storage capacity (Memory) for storing an application program of the information processing terminal 30 (in this case, storage capacity size required to install terminal application program [electronic application program DX for machine sort A] corresponds to 8 K bytes, whereas empty storage capacity for storing application program of information processing terminal 30 corresponds to 32 K bytes). Then, the transmission data judging unit 19 determines [electronic money application program DX for machine sort A] as the transmission data, and informs this determined transmission data to the data transmitting unit 20 (10). It should also be noted that when the user selects [point service (A)], [point application program for machine sort A] is similarly determined as the transmission data.

The data transmitting unit 20 derives the data designated by the transmission data judging unit 19 from a large number of transmission data 23 retained therein, and then transmits the derived data to the data receiving unit 41 of the information processing terminal 30 (11). The data which is transmitted to the data receiving unit 41 contains information as to the confirmation day/time of the latest version, and the URL information used to acquire the latest version of the terminal application program in addition to the terminal application program.

The data receiving unit 41 transfers the received data to the reception data verifying unit 33 (12). The reception data verifying unit 33 performs the verification of the reception data, and installs a terminal application program based upon the verified data so as to store the installed terminal application program in the storage unit 32 (13).

In such a case that the reception day/time of the reception data has expired the confirmation day/time of the latest version, the communication unit 35 is communicated with such a server which is indicated by the URL information used to acquire the latest version so as to acquire the latest version of the terminal application program, and then, transfers the acquired latest version of the terminal application program to the reception data verifying unit 33 (14). After this data has been verified, the verified data is installed to be stored in the storage unit 32.

The terminal application program 31 which has been loaded and installed in the information processing terminal 30 in the above-explained process manner is initiated, and is communicated with the card application program 11, so that the service is carried out.

Figure 5:
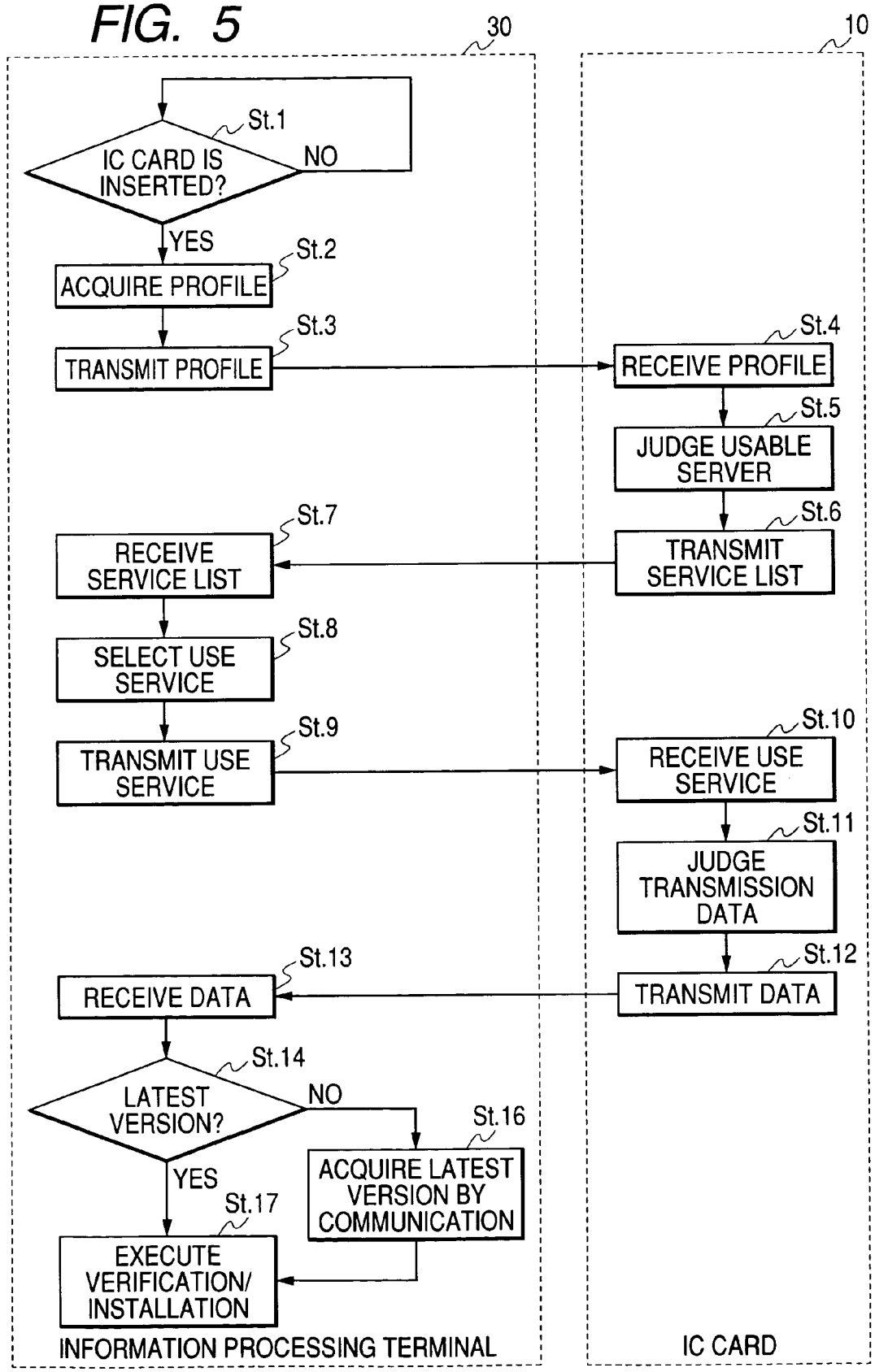
FIG. 5 is a flow chart for indicating a process flow operation executed between the secure device and the information processing terminal in the first embodiment mode of the present invention.

FIG. 5 is a flow chart for describing a process sequential operation of this IC card 10 and the information processing terminal 30. When the IC card 10 is inserted into the information processing terminal 30 ("Yes" in step 1), this information processing terminal 30 acquires a terminal process file (step 2), and transmits the acquired terminal profile to the IC card 10 (step 3). When the IC card 10 receives the terminal profile (step 4), this IC card 10 judges a usable service of the information processing terminal 30 (step 5).

Figure 6:
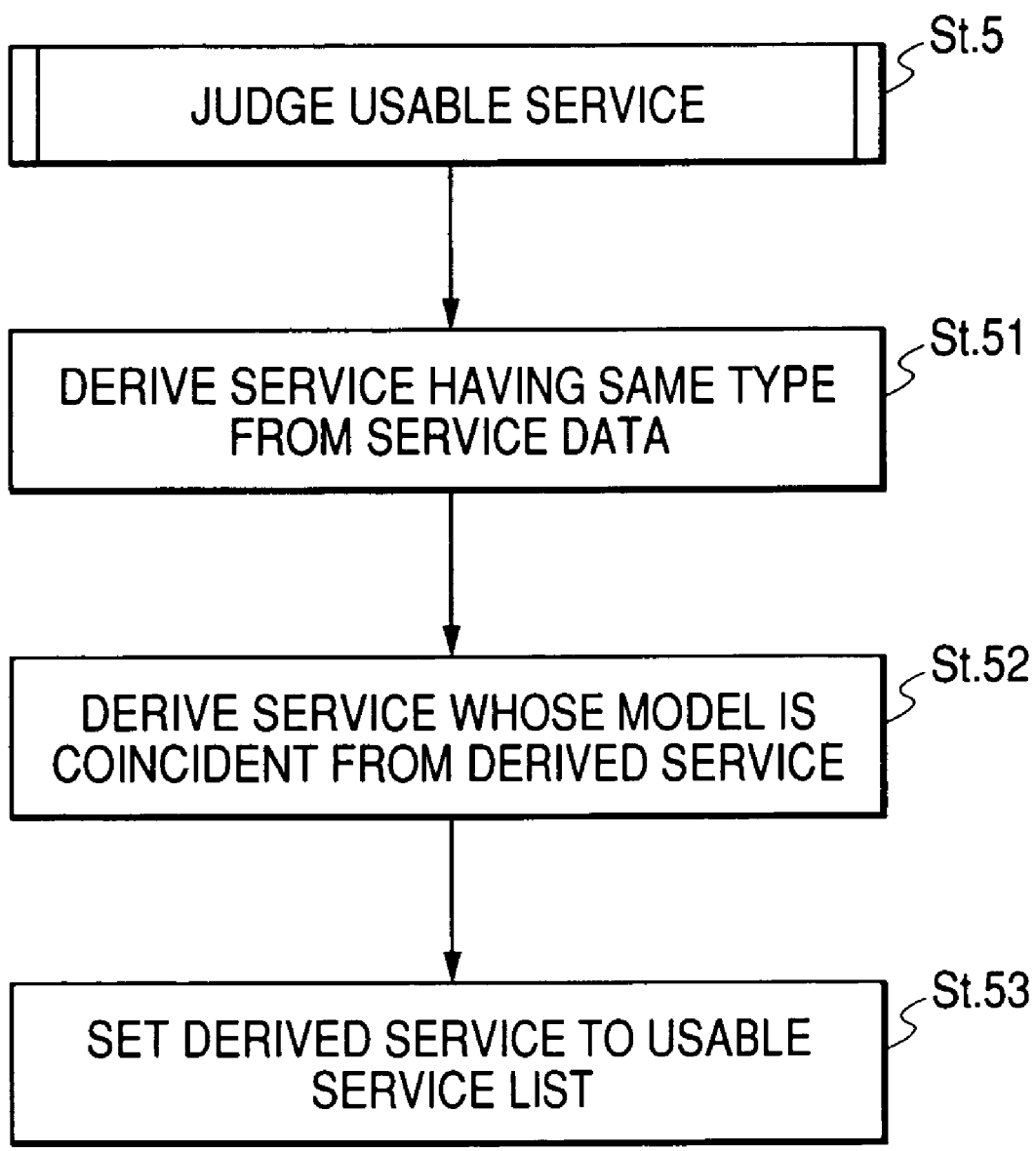
FIG. 6 is a flow chart for describing a usable service judging sequential operation in the first embodiment mode of the present invention.

This judging operation of the usable service is carried out in accordance with a sequential operation shown in FIG. 6. That is, the IC card 10 derives such a service that a machine sort (Type) thereof is made coincident with the machine sort of the information processing terminal 30 from the service data 21 (step 51), and further, derives such a service that a model number (Model) thereof is made coincident with the model number of the information processing terminal 30 from the derived service (step 52). Then, the IC card 10 contains the derived service as the usable service of the information processing terminal 30 in the usable service list (step 53).

The IC card 10 transmits this usable service list to the information processing terminal 30 (step 6).

The information processing terminal 30 receives the usable service list (step 7), selects a service which is used (step 8), and transmits the information of this selected service to the IC card 10 (step 9).

When the IC card 10 receives the information as to the service used in the information processing terminal 30 (step 10), the IC card 10 judges such a terminal application program which should be transmitted (step 11).

Figure 7:
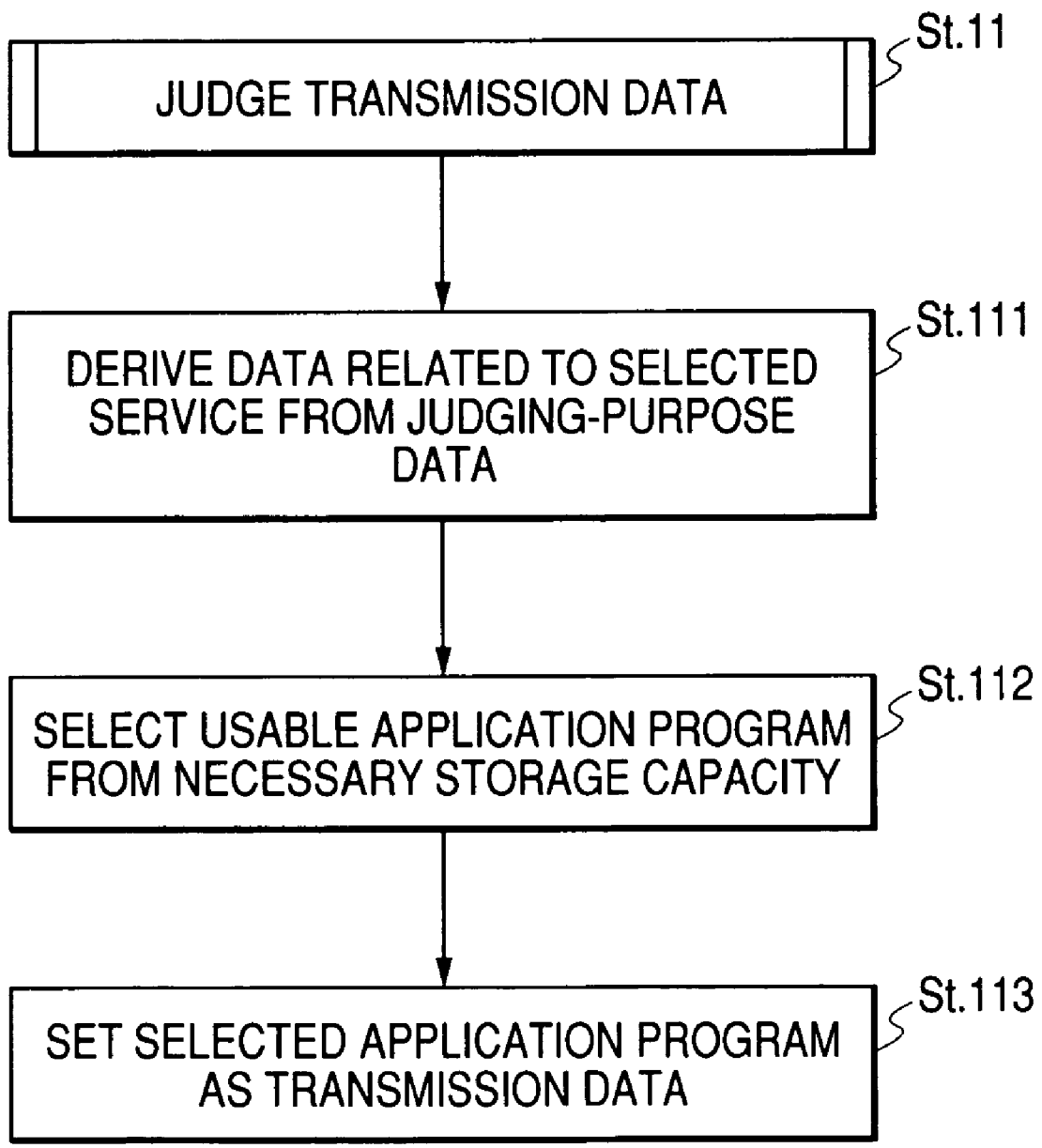
FIG. 7 is a flow chart for describing a transmission data judging sequential operation in the first embodiment mode of the present invention.

This judging operation of the terminal application program is carried out in accordance with a process sequential operation shown in FIG. 7. In other words, the IC card 10 derives data related to the selected service from the judging-purpose data 22 (step 111), compares a necessary storage capacity with an empty storage capacity of the information processing terminal 30 so as to select a usable terminal application program (step 112), and then, sets the selected terminal application program as transmission data (step 113).

The IC card 10 transmits the terminal application program which has been selected in the above-explained process manner to the information processing terminal 30 (step 12).

When the information processing terminal 30 receives the terminal application program (step 13), the information processing terminal 30 discriminates as to whether or not the version of this received terminal application program corresponds to the latest version thereof (step 14). When the version of this received terminal application program corresponds to the latest version, the information processing terminal 30 verifies the received terminal application program, and thereafter, installs the verified terminal application program (step 17). To the contrary, when the version of this received terminal application does not correspond to the latest version, the information processing terminal 30 acquires the latest terminal application by way of a communication manner (step 16), verifies the acquired latest terminal application program, and thereafter, installs the verified latest terminal application program (step 17).

When the terminal application program is transmitted from the IC card 10 to the information processing terminal 30, such a license input screen shown in FIG. 8 may be alternatively displayed on the information processing terminal 30; an entered license code may be alternatively verified; and then, only when the verification succeeds, the transmission of the terminal application may be alternatively executed.

Figure 9:
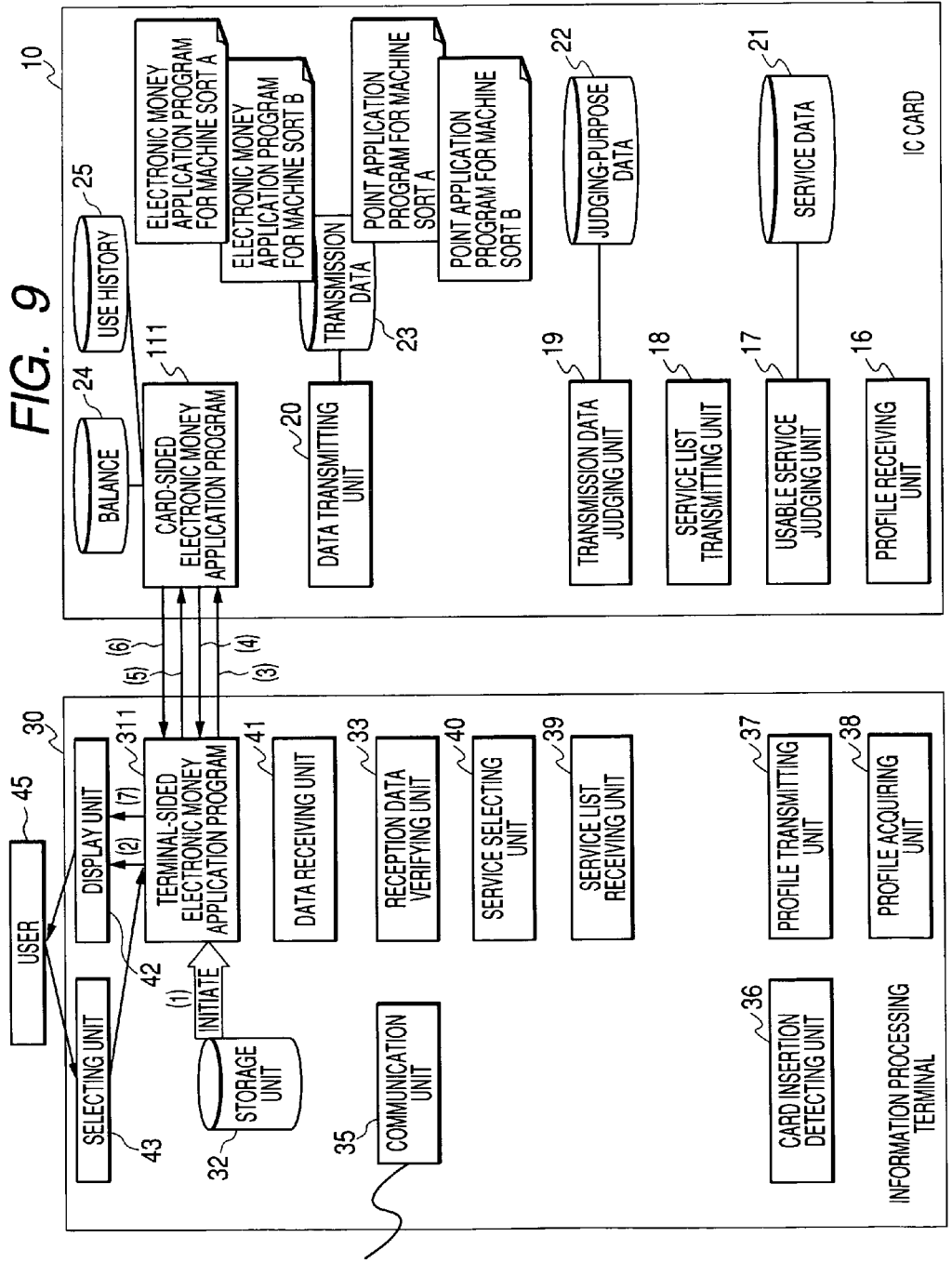
FIG. 9 is a diagram for explaining a process operation executed in the case that an electronic money application program is loaded in the first embodiment mode of the present invention.

FIG. 9 exemplifies such a condition that after a terminal application program has been installed into the information processing terminal 30, this installed terminal application program is initiated, and then, a service is executed in conjunction with a card application program of the IC card 10. In this drawing, it is so assumed that as the above-described terminal application, an electronic money application program 311 has been installed which displays a balance of electronic money and a use history.

When a user 45 inserts the IC card 10 into the information processing terminal 30, the terminal-sided electronic money application program 311 is initiated which has been automatically loaded on the information processing terminal 30 (1). This terminal-sided electronic money application program 311 displays on the display unit 42, such a service content that both a display of a balance and a display of a use history can be used, as a service given to the user 45 (2). Also, the terminal-sided electronic money application program 311 causes the user 45 to select either the balance display or the use history display by using a selecting unit 43 (2).

The terminal-sided electronic money application program 311 selects a card-sided electronic money application program 111 as a communication subject, and requests the information selected by the user 45 (3). The card-sided electronic money application program 111 requests authentication of the user 45 (4). The terminal-sided electronic money application 311 causes the user 45 to enter PIN (personal identification number), and informs the entered PIN to the card-sided electronic money application 111 (5). The card-sided electronic money application program 111 confirms that the PIN is justified, and then, transmits the request information such as a money balance 24 and a use history 25 to the information processing terminal 30 (6). The terminal-sided electronic money application program 311 displays the information acquired from the card-sided electronic money application program 11 on the display unit 42 (7).

As previously explained, the service of the electronic money can be utilized by merely inserting the IC card 10 into the information processing terminal 30.

Figure 10:
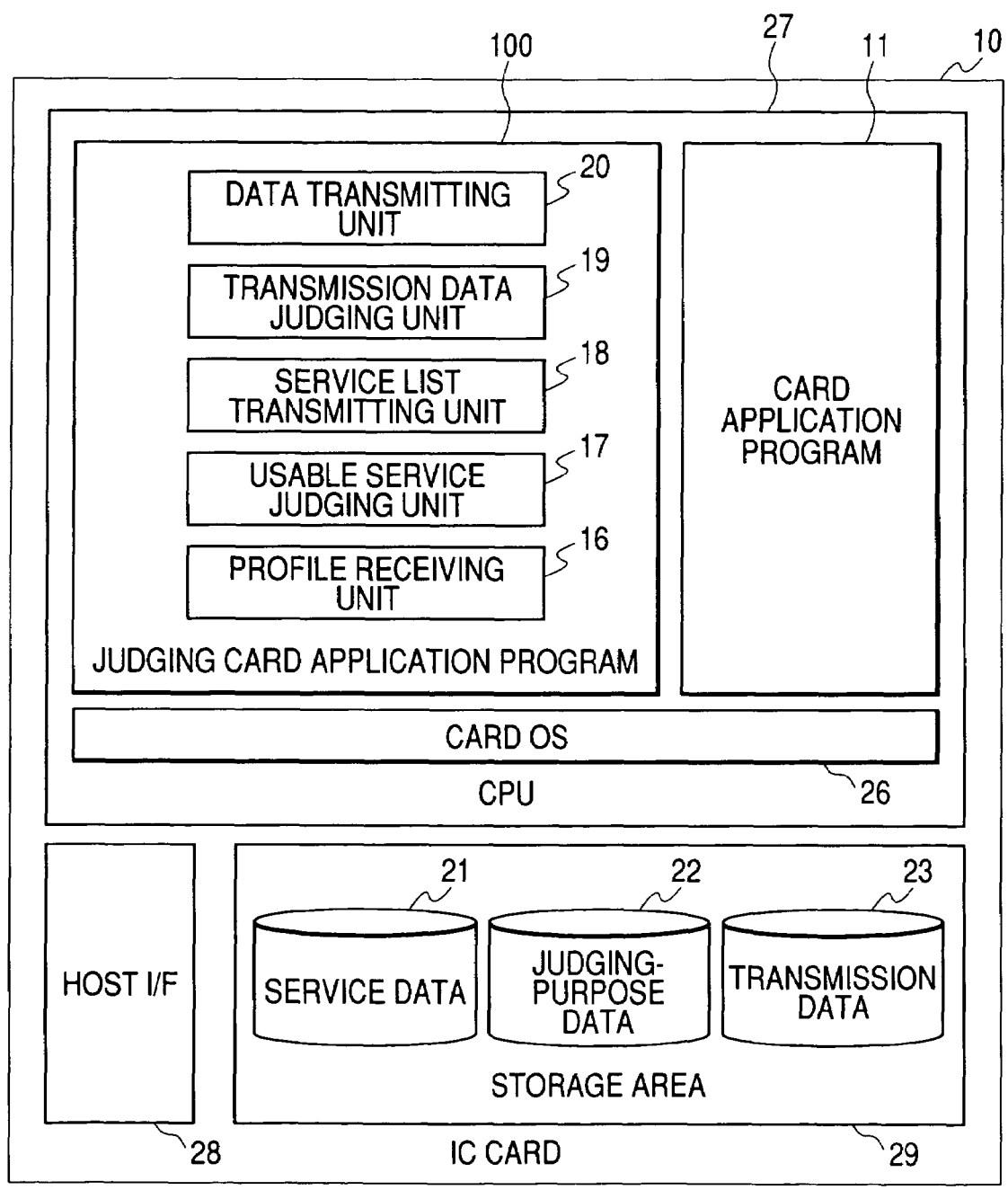
FIG. 10 is a diagram for indicating structures of hardware and software of an IC card in the first embodiment mode of the present invention.

FIG. 10 illustratively shows a correspondence relationship between the function block of FIG. 2 and hardware/software of the IC card 10. The normal IC card 10 is equipped with a CPU 27 which constitutes a control unit of the IC card 10, a data storage area 29, and a host interface (I/F) 28 with respect to the information processing terminal 30, which are contained in a tamper resistant module. Service data 21, judging-purpose data 22, and transmission data 23 are stored in this storage area 29. Also, a card OS (operating format) 26, a card application program 11, and a judging card application program 100 are provided as an application program for defining operations of the CPU 27 in the IC card 10. The card OS 26 defines a basic operation of the IC card 10. The card application program 11 realizes a secure processing function of a service which is provided in conjunction with the terminal application program. The judging card application program 100 realizes the various functions as to the profile receiving unit 16, the usable service judging unit 17, the service list transmitting unit 18, the transmission data judging unit 19, and the data transmitting unit 20.

Figure 11:
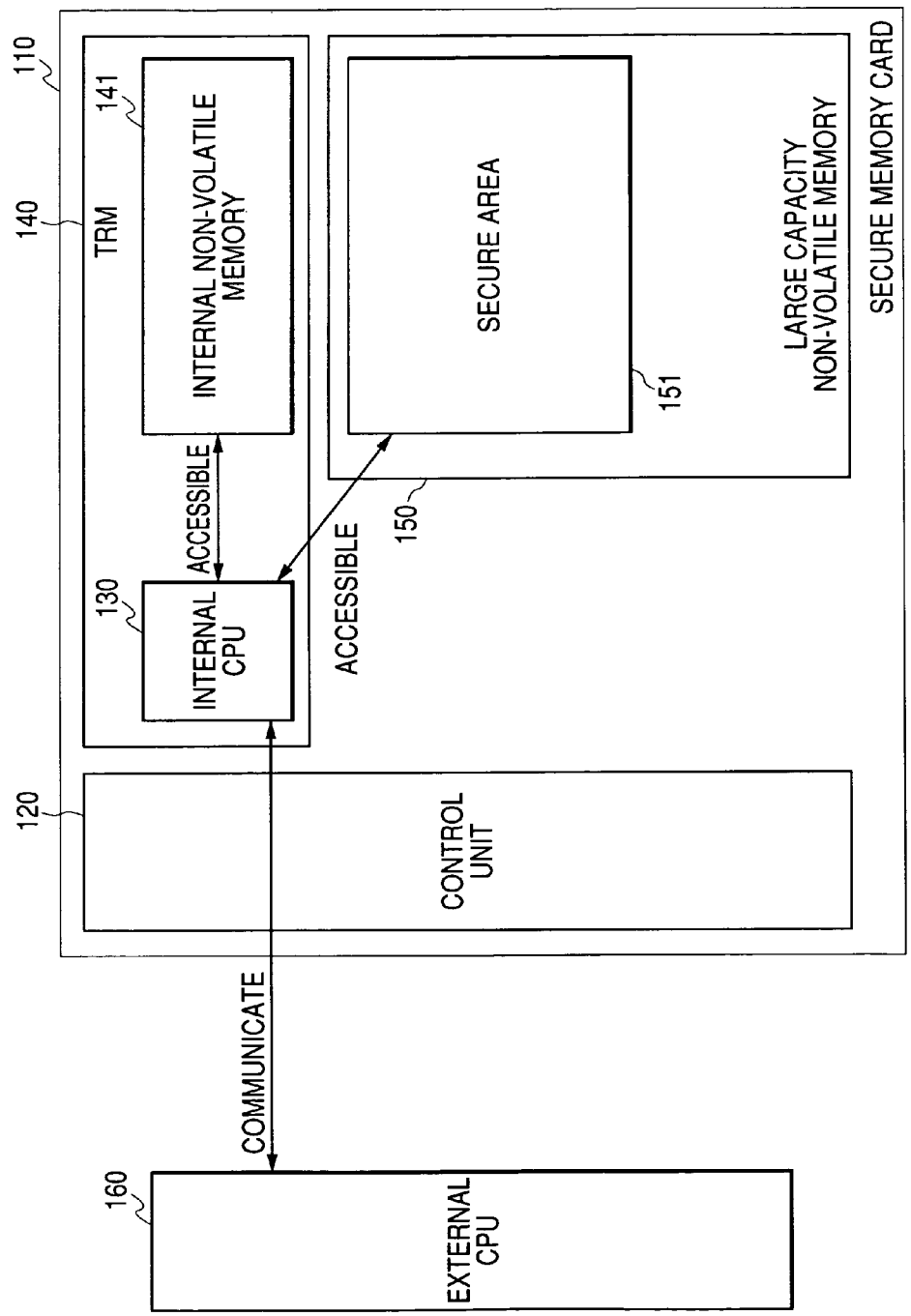
FIG. 11 is a structure of a secure memory card in the first embodiment mode of the present invention.

Also, the Applicant of the present invention has proposed the semiconductor memory card (will be referred to as "secure memory card" in this specification) having the secure and large storage memory area. As indicated in FIG. 11, this secure memory card is equipped with an internal CPU 130 and an internal non-volatile memory 141 which are contained in a tamper resistant module (TRM) 140; a large storage non-volatile memory (flash memory) 150 which contains a secure area 151; and a control unit 120 functioning as a host I/F. Both the internal non-volatile memory 141 and the secure area 151 can be accessed only by the internal CPU 130. This internal CPU 130 encrypts data and then stores the encrypted data into the internal non-volatile memory 141 and the secure area 151. This secure area 151 is provided in the large capacity non-volatile memory (flash memory) 150 without having the tamper resistant characteristic. The storage capacity of this non-volatile memory 150 is considerably larger than that of the internal non-volatile memory 141. The secure area 151 owns a secrecy which is conformed to that of the internal non-volatile memory 141. When an external CPU 160 of an information processing terminal requests to read/write data with respect to the secure area 151, this external CPU 160 sends a command to the control unit 120, and then, this control unit 120 interprets the command and transfers the interpreted command to the internal CPU 130.

Figure 12:
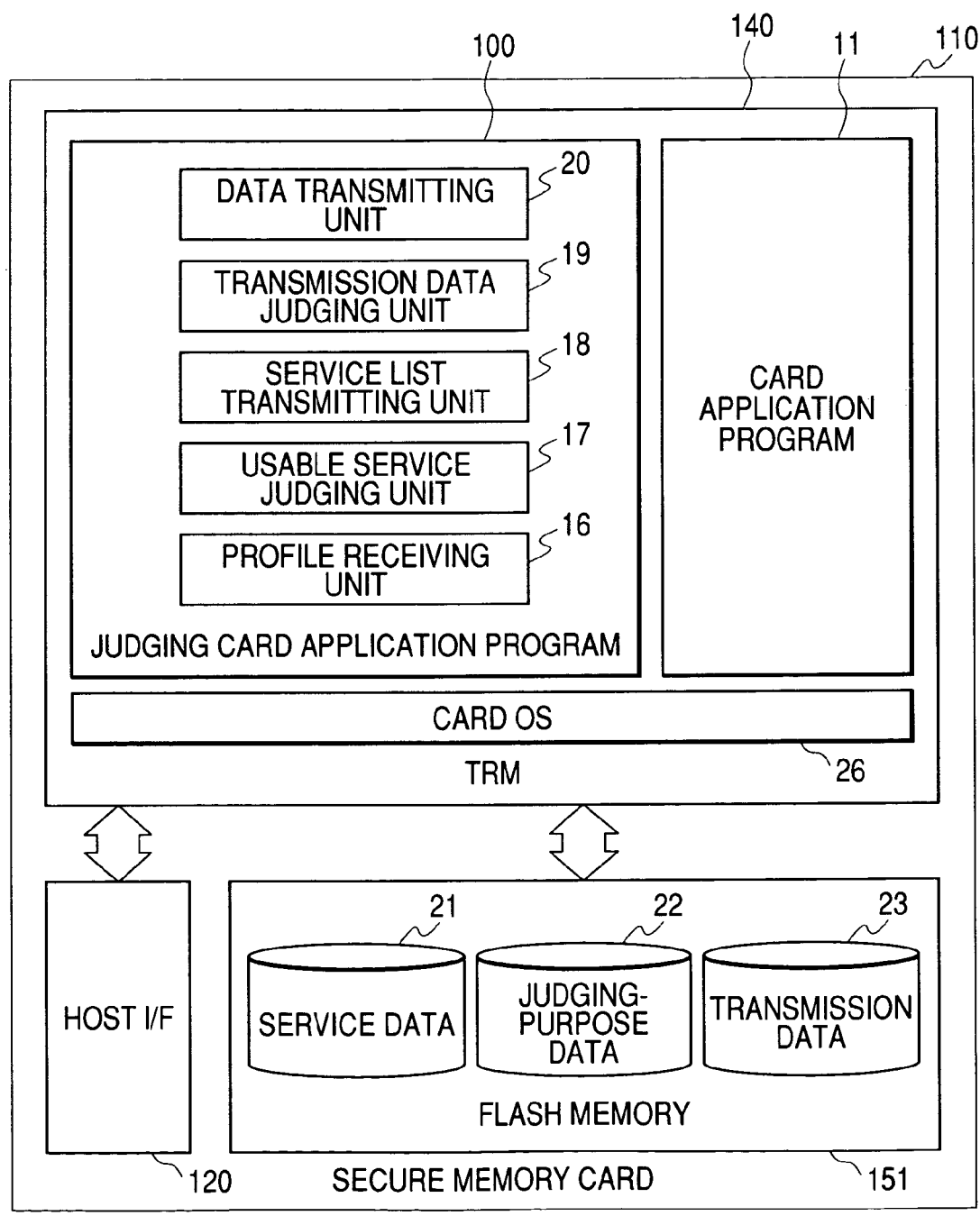
FIG. 12 is a diagram for indicating both a structure of hardware and a structure of software of the information processing terminal, in the first embodiment mode of the present invention.

FIG. 12 illustratively shows a relationship between a secure memory card 110 and the function blocks of FIG. 2. The card OS 26 for defining the operation of the internal CPU 130, the card application program 11, and the judging card application 100 are stored in the internal non-volatile memory 150 of the TRM 140, whereas the service data 21, the judging-purpose data 22, and the transmission data 23 are stored in the secure area 151 of the flash memory. Also, data transmission and reception operations are carried out via a host I/F 120 between the information processing terminal 30 and the secure card 110.

Figure 13:
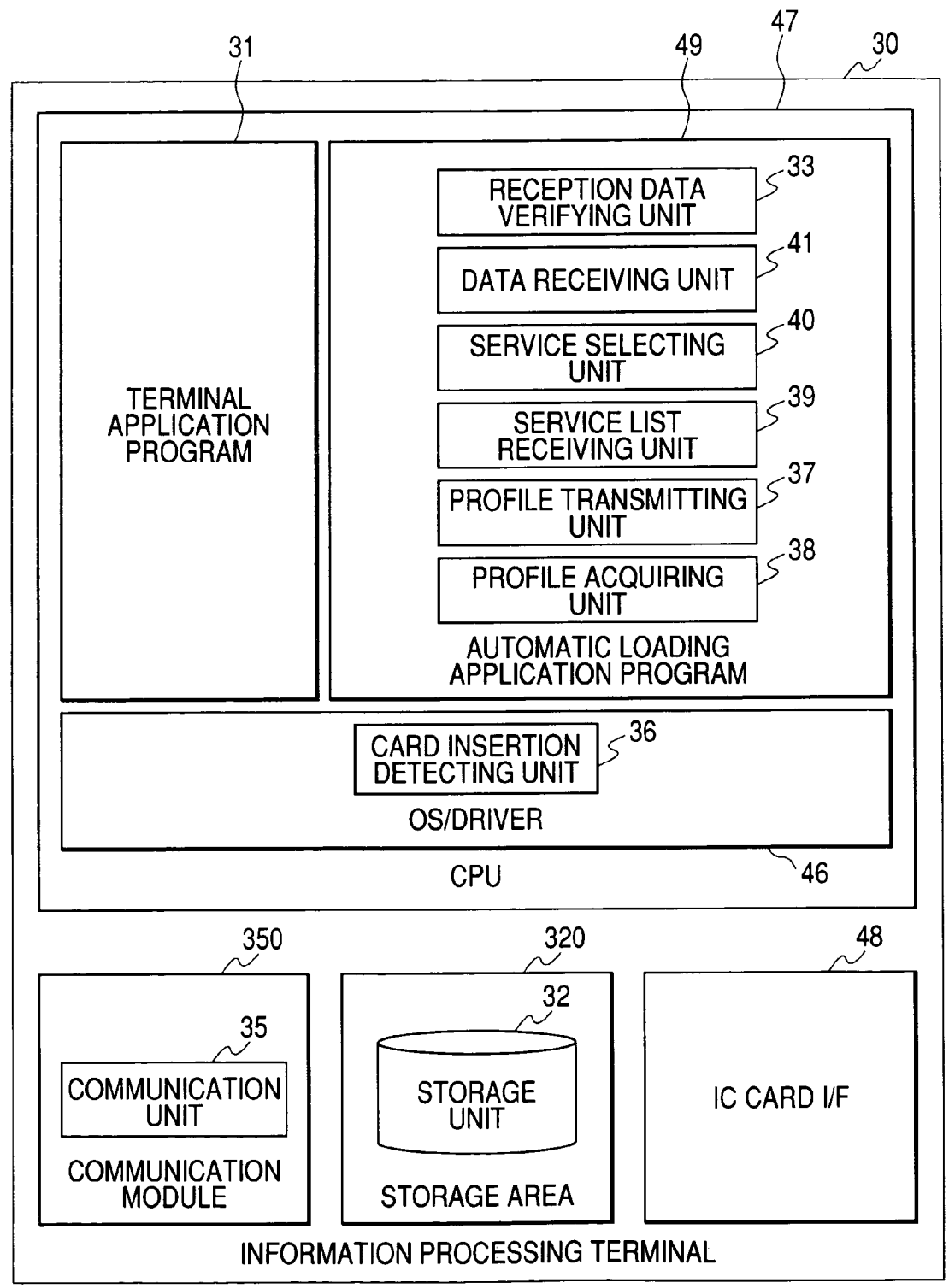
FIG. 13 is a diagram for indicating both a structure of hardware and a structure of software of the information processing terminal, in the first embodiment mode of the present invention.

Also, FIG. 13 illustratively shows a relationship between the function blocks, and the hardware and software of the information processing terminal 30. The information processing terminal 30 is equipped with a communication module 350 which constitutes the communication unit 35, a storage area 320 which constitutes the storage unit 32, an interface 48 with respect to the IC card 10, and a CPU 47 which constitutes a control unit of the information processing terminal 30. As software for defining operations of the CPU 47, an OS/driver program 46, the terminal application program 31 transmitted from the IC card 47, and also, an automatic loading application program 49 are installed in the information processing terminal 30. The OS/driver program 46 defines a basic operation of the information processing terminal 30, and constitutes the card insertion detecting unit 36. The automatic loading application program 49 realizes the respective functions as to the profile acquiring unit 38, the profile transmitting unit 37, the service list receiving unit 39, the service selecting unit 40, the data receiving unit 41, and the reception data verifying unit 33.

Figure 14:
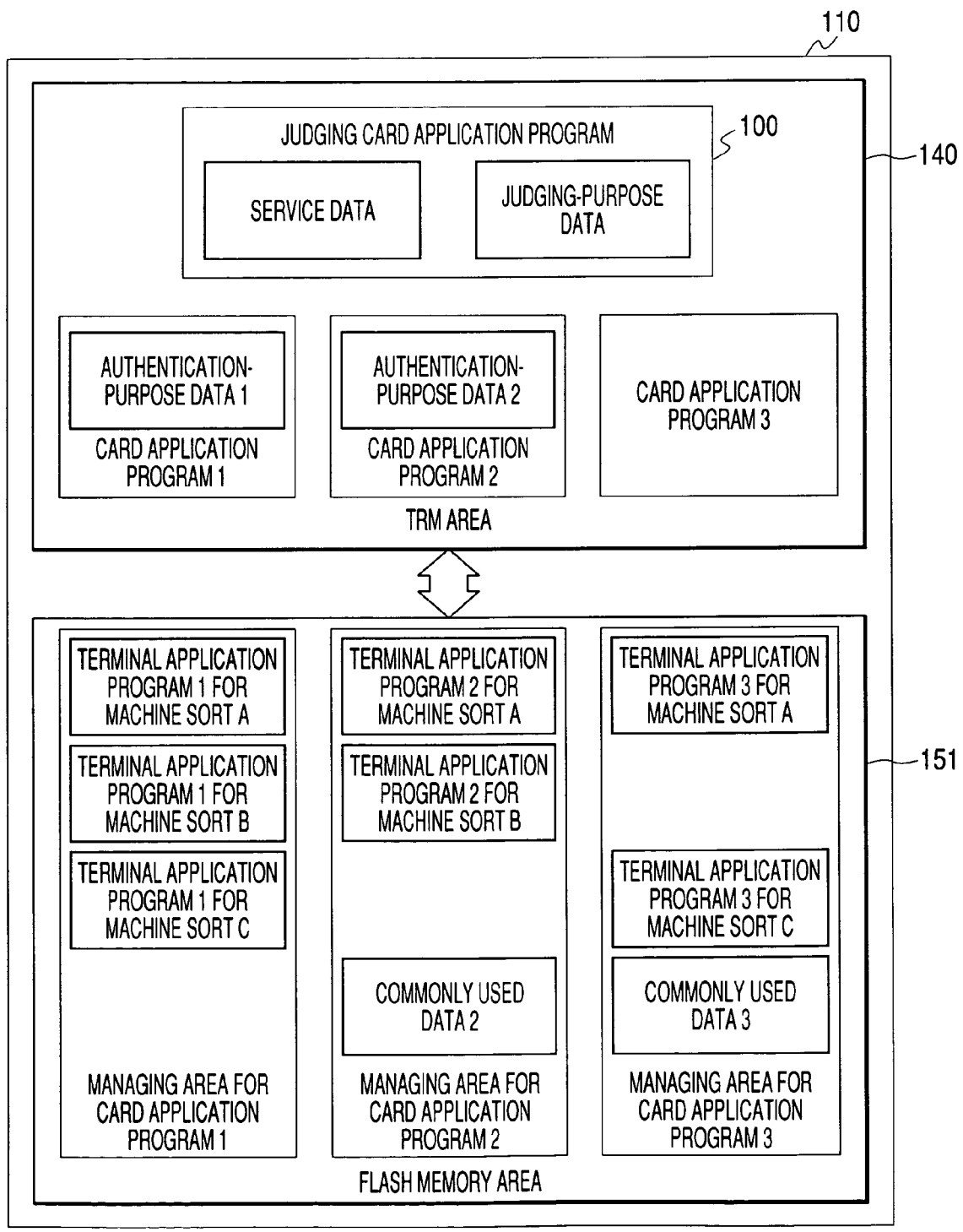
FIG. 14 is a diagram for showing a data structure used in the secure memory card in the first embodiment mode of the present invention.

Also, FIG. 14 illustratively represents an example of a data structure contained in the secure memory card 110. In this case, this drawing shows such a case that three sorts of card application programs, namely a card application program 1, another card application program 2, and another card application 3 are retained in the TRM area 140 of the secure memory card 110. These card application programs 1 to 3 may provide secure processing functions in the respective services in conjunction with a terminal application program which is installed to the information processing terminal 30.

A card application program may have authentication-purpose data, which is like the above-explained card application program 1 and card application program 2, if required. For instance, in such a case that this authentication-purpose data corresponds to authentication-purpose data for authenticating a license, when a terminal application program is installed, an internal CPU of the secure memory card 110 requests a user to enter a license code in conjunction with the automatic loading application program installed on the side of an information processing terminal. Then, the internal CPU verifies the entered license code by employing this authentication-purpose data, and executes the installing operation of the terminal application program when the verifying operation of this license code can succeed.

The judging card application program 100 provides a list of usable services which can be used in this information processing terminal to the user based upon the service data in conjunction with the automatic loading application program installed on the side of the information processing terminal, and then, installs such a terminal application program corresponding to the service selected by the user. At this time, in the case that a card application program owns authentication-purpose data, which is like the card application program 1 and the card application program 2, and this authentication-purpose data corresponds to such an authentication-purpose data for authenticating a license, the automatic loading application program installed on the side of the information processing terminal authenticates the license in conjunction with the respective card application programs, if necessary.

The terminal application programs are stored in a managing area which has been set to a secure area 151 of the flash memory, and is managed by the card application program of the respective services. While a plurality of terminal application programs corresponding to machine sorts and models of the information processing terminals have been managed in this card application managing area, a proper terminal application program which has been selected based upon the judging card application program 100, the automatic loading application program provided on the terminal side, and the respective card application programs is installed to the information processing terminal. In the card application managing area, which is like a managing area for the card application program 2 and a managing area for the card application program 3, common data is stored, if required, which does not depend upon a machine sort of an information processing terminal which is used in the respective services.

The card application program 1 corresponds to, for example, a VPN (Virtual Private Network) communication-purpose card application program. In this case, the authentication-purpose data 1 is used in an authentication process operation with respect to a server when a secure session of a VPN is established. The terminal application program which has been stored in the managing area of the card application program 1 corresponds to a VPN communication-purpose terminal application program. This VPN communication-purpose terminal application program relays a communication operation between the server and the secure memory card when the secure session of the VPN is established, and performs a data communication between the server and the secure memory card after the secure session has been established.

The card application program 2 corresponds to, for example, an electronic mail-purpose card application program. In this case, a user authentication operation when an electronic mail is viewed, and an authentication operation with respect to a mail server when an electronic mail is received are carried out by this electronic mail-purpose card application program by employing the authentication-purpose data 2. Also, the terminal application program which has been stored in the managing area of the card application program 2 corresponds to an electronic mail-purpose terminal application program. This electronic mail-purpose terminal application program displays an electronic mail when the electronic mail is viewed, forms an electronic mail, and manages electronic mails. The commonly used data 2 corresponds to an electronic mail-purpose commonly used data, and corresponds to DBs of reception/transmission mails.

The card application program 3 corresponds to, for instance, a scheduler-purpose card application program. This scheduler-purpose card application program executes a user authentication operation when a schedule is viewed, and an authentication operation between a server and the own information processing terminal when a schedule synchronizing operation is performed. The terminal application program which has been stored in the managing area of the card application program 3 corresponds to a scheduler-purpose terminal application program. The scheduler-purpose terminal application program executes s display operation when the schedule is viewed, a registering operation, and manages local data of the schedule. The common data 3 corresponds to scheduler common data, a DB (database) of a schedule, commonly used MultiMedia data, and the like.

Alternatively, such terminal application programs which are different from each other in the case that a license is authenticated and in such a case that a license is not authenticated may be alternatively installed to the information processing terminal 30.

It should also be noted that in the above-explained process operation, the judging operation for judging that which terminal application program is installed in the information processing terminal 30 is carried out on the side of the secure device. Alternatively, the judging-purpose data may be acquired from the secure device, so that the information processing terminal 30 may perform the judging process operation. In this alternative case, since the judging process operation is carried out by the CPU of the information processing terminal 30, which owns the higher processing capability, there is such an effect that the judging process operation can be carried out in a higher speed, as compared with that of such a case that the judging process operation is carried out on the side of the secure device. On the other hand, in such a case that the judging process operation is carried out on the side of the secure device, since the judging card application programs are replaced, the algorithm of the judging process operation may be set in response to a sort of terminal application program every secure device, while the automatic loading application program installed on the side of the information processing terminal 30 is not replaced. In other words, since an issuing person of a terminal application program previously sets both the terminal application program and an algorithm of a judging process operation to the secure device, an installing operation of the terminal application program to the information processing terminal 30 may be controlled by the issuing person of the terminal application program, and the secure device may be utilized as a distribution means of the terminal application program.

As previously explained, while a plurality of card application programs are present in the secure device of the first embodiment mode, such a proper terminal application program corresponding to a card application program (namely, in correspondence with machine sort and memory capacity of information processing terminal) may be selectively installed to this information processing terminal to which this secure device has been mounted.

This installed terminal application not only can access the secure device with respect to the installed information processing terminal, but also can realize the access function to the server.

The secure device determines a candidate of such a terminal application program which is installed to the information processing terminal based upon a terminal profile acquired from the information processing terminal. Since the judging data which is employed by this secure device is rearranged, the complex conditions which are different from each other every service can be set as the condition for determining the terminal application program.

Also, when the terminal application program is installed, the authenticating operation of the license can be carried out.

Second Embodiment Mode

Next, as a second embodiment mode of the present invention, a description is made of a secure device which retains a terminal application program corresponding to a single service.

As shown in FIG. 15, while an IC card 10 (namely, secure device) retains a plurality of terminal application programs 15 corresponding to different versions of the same service, the IC card 10 transmits such a terminal application program 31 which has been selected in response to a sort of an information processing terminal 30 to this information processing terminal 30.

FIG. 16 indicates both an arrangement of this IC card 10 and an arrangement of the information processing terminal 30 in a block diagram. The IC card 10 is equipped with a card application program 11, judging-purpose data 22, and transmission data 23, and is further equipped with a profile receiving unit 16, a transmission data judging unit 19, and a data transmitting unit 20. The judging-purpose data 22 is used to discriminate a terminal application program which is adapted to the information processing terminal 30. The transmission data 23 contains a plurality of terminal application programs. The profile receiving unit 16 receives a terminal profile from the information processing terminal 30. The transmission data judging unit 19 judges such a terminal application program which is sent to the information processing terminal 30 by employing the judging-purpose data 22. The data transmitting unit 20 derives the terminal application program judged by the transmission data judging unit 19 from the transmission data 23, and then, transmits the derived terminal application program to the information processing terminal 30.

On the other hand, the information processing terminal 30 is equipped with a card insertion detecting unit 36, a profile acquiring unit 38, a profile transmitting unit 37, a data receiving unit 41, a reception data verifying unit 33, a storage unit 32, and a communication unit 35. The card insertion detecting unit 36 detects an insertion of the IC card 10. The profile acquiring unit 38 acquires a terminal profile of the information processing terminal 30. The profile transmitting unit 37 transmits this acquired terminal profile to the IC card 10. The data receiving unit 41 receives the terminal application program 31 transmitted from the IC card 10. The reception data verifying unit 33 verifies the received terminal application 31. The storage unit 32 stores thereinto such a terminal application program 31 which has no problem in the verifying operation. The communication unit 35 acquires the latest version of the terminal application program from a service provider in the case that the version of the terminal application program received from the IC card 10 has been updated.

Operations as to the card insertion detecting unit 36, the profile transmitting unit 37, the profile acquiring unit 38, and the profile receiving unit 16 are the same as those of the first embodiment mode (FIG. 2).

When the transmission data judging unit 19 receives a terminal profile from the profile receiving unit 16, the transmission data judging unit 19 judges data which should be transmitted by employing the judging-purpose data 22. As shown in FIG. 17(*b*), as to the judging-purpose data 22, versions of services which can be used, depending upon a machine sort, are different. Assuming now that a terminal profile received from the information processing terminal 10 corresponds to such a data indicated in FIG. 17(*a*), the transmission data judging unit 19 determines an application program for A as transmission data based upon the judging-purpose data 22, and then transfers this determined transmission data to the data transmitting unit 20.

Operations as to the data transmitting unit 20, the data receiving unit 41, the reception data verifying unit 33, the storage unit 32, and the communication unit 35 are identical to those of the first embodiment mode (FIG. 2).

Also, process sequential operations executed in the IC card 10 and the information processing terminal 30 correspond to such process sequential operations of the flow chart shown in FIG. 5 from which the process operations defined from the step 5 to the step 10 have been removed.

As previously described, when this IC card 10 is mounted on the information processing terminal 30, the terminal application program is automatically loaded in the information processing terminal 30, while this terminal application program executes the service of the version in response to the machine sort of this information processing terminal 30. Thereafter, this terminal application program is installed and the above-described service is commenced.

Figure 18:
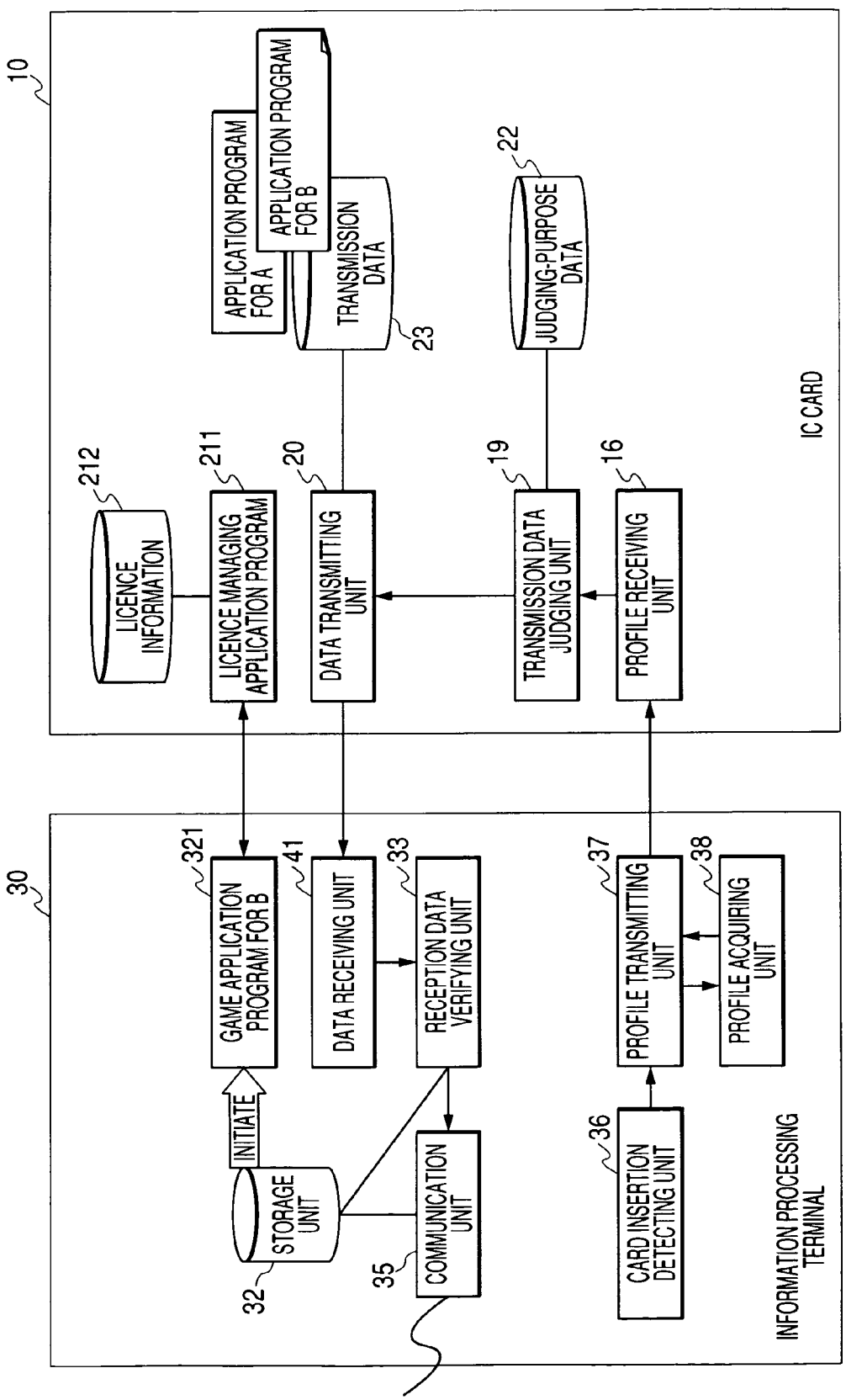
FIG. 18 is a diagram for indicating a process operation executed in the case that a game application program is loaded in the second embodiment mode of the present invention.

FIG. 18 illustratively shows such an exemplification that the IC card 10 which has loaded a game application program 321 on the information processing terminal 30 manages a license of the game application program in accordance with a card application program in conjunction with this game application program 321. In the case that the judging-purpose data 22 is constituted by such an information of (b) of FIG. 19, and the terminal profile of the information processing terminal 30 corresponds to such a data shown in (a) of FIG. 19, the game application program 321 for B is installed in the information processing terminal 30.

Figure 19:
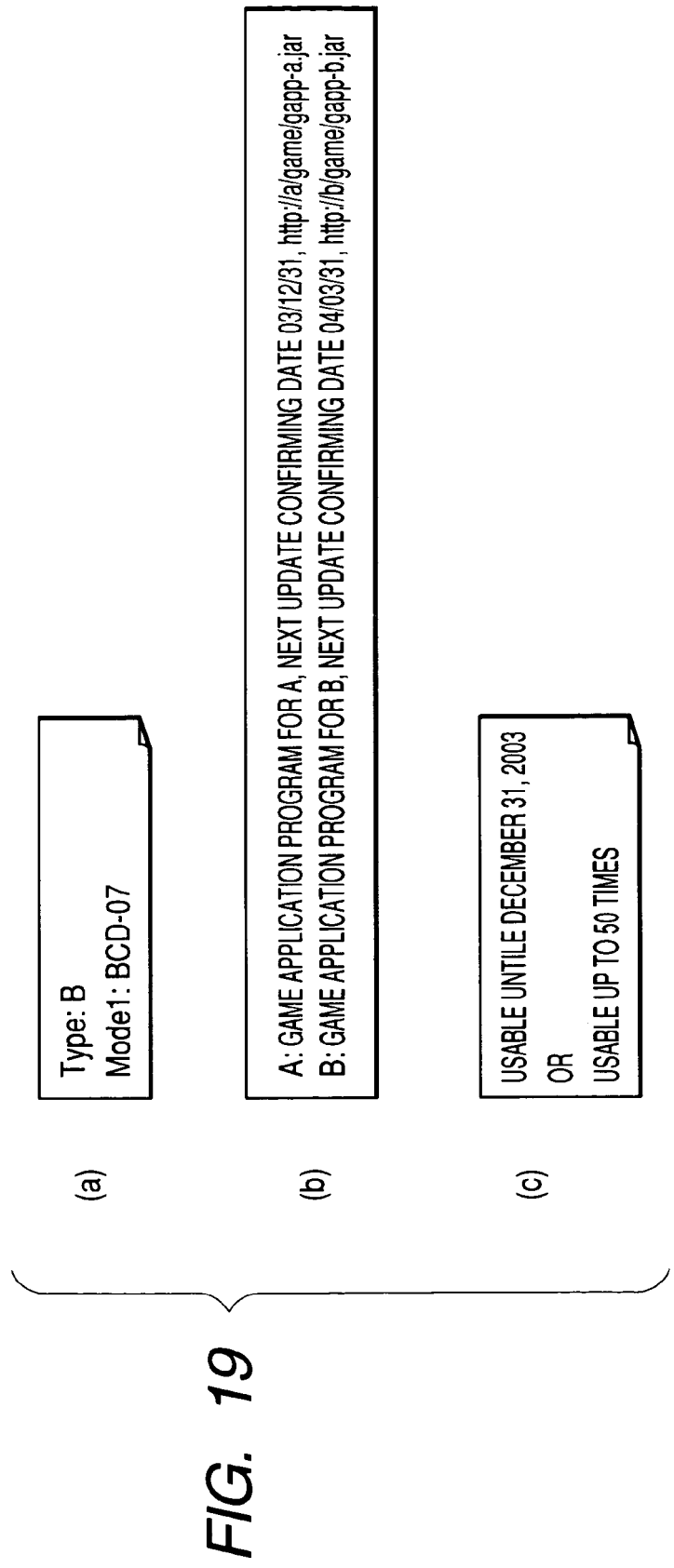
FIG. 19a indicates an example of a terminal profile in the second embodiment mode of the present invention.
FIG. 19b shows an example of judging data in the second embodiment mode of the present invention.
FIG. 19(c) represents an example of license information in the second embodiment mode of the present invention.

When a communication is established from the game application 321 for B, a license managing application program 211 which corresponds to the card application program of the IC card 10 limits a use of the game application program based upon the license information 212 shown in (c) of FIG. 19.

As previously explained, since the card application of the IC card which executes the service in conjunction with the game application program which has been installed in the information processing terminal confirms the license, the license managing operation can be firmly carried out.

Figure 20:
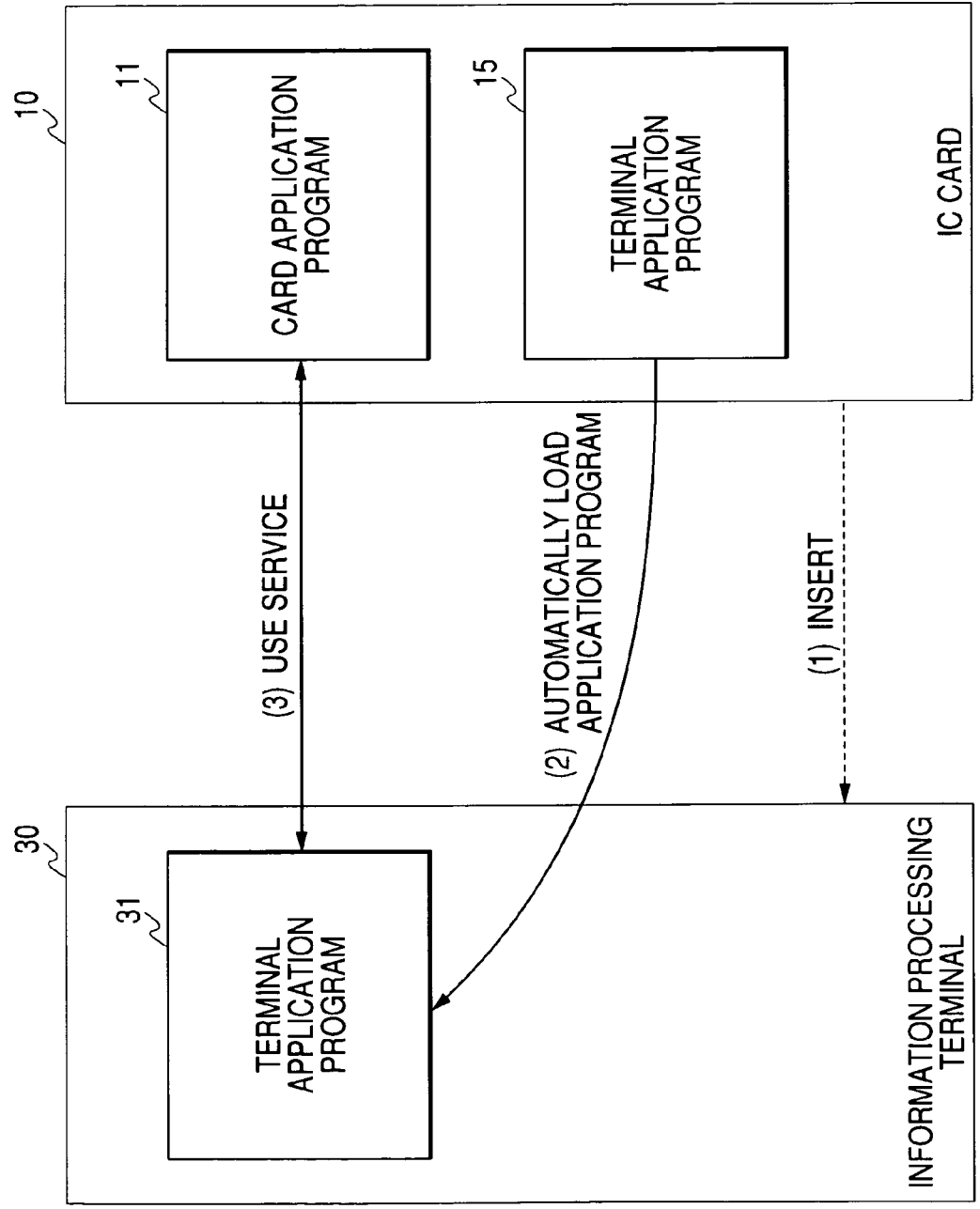
FIG. 20 is a diagram for schematically representing a process sequential operation executed between the secure device and the information processing terminal, according to the second embodiment mode of the present invention.
Figure 21:
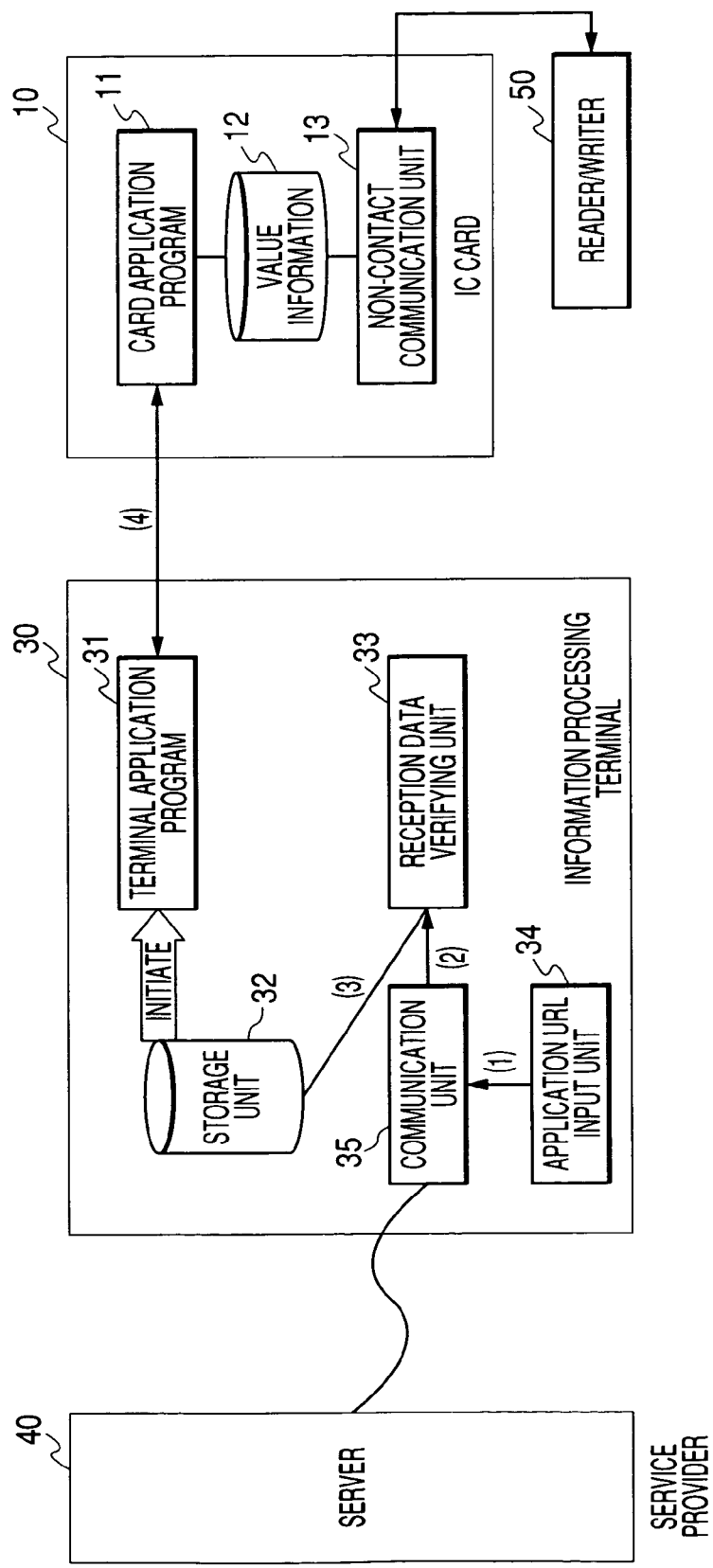
FIG. 21 is a diagram for schematically representing the process sequential operation executed between the conventional secure device and the conventional information processing terminal.

In this second embodiment mode, such a case has been explained. That is, the IC card 10 retains a plurality of terminal application programs corresponding to the same service. Alternatively, while the IC card 10 retains only one terminal application program, when this IC card 10 is mounted on the information processing terminal 30, this only one terminal application program may be loaded on the information processing terminal 30 and may be installed thereinto. In this alternative case, as shown in FIG. 20, when the IC card 10 is mounted on the information processing terminal 30, a terminal application program 15 which has been retained on the IC card 10 is automatically loaded on the information processing terminal 30. As a consequence, a service may be commenced while the user is not forcibly required to perform a cumbersome operation.

It should also be noted that this second embodiment mode, the description has been made of such a case that the terminal application program is loaded from the secure device to the information processing terminal so as to be installed thereinto. Alternatively, while not only the terminal application program but also such a data are retained in the secure device, which are required to execute the process operation of the information processing terminal, both the terminal application program and the data may be loaded to the information processing terminal when the secure device is mounted.

For instance, in such a case that the terminal application program corresponds to a content browser (player) and the data corresponds to a content (electronic book data), since only an electronic book card is purchased and then is mounted on an information processing terminal, this content may be read.

Otherwise, in such a case that the data corresponds to both a key and a content which has been encrypted based upon this key, when a secure device is inserted into an information processing terminal, the encrypted content is loaded to this information processing terminal. In the case that a content browser has already been set in the information processing terminal, when an authenticating operation is performed with respect to the secure device based upon PIN, the key may be given from the secure device, so that the content may be alternatively read.

In the above-explained second embodiment mode, the description has been made of such a case that the IC card is employed as the secure device. Alternatively, similar to the first embodiment mode, a secure memory card may be employed. In this alternative case, such a terminal application program having a larger storage capacity may be installed.

Third Embodiment Mode

Next, as a third embodiment mode of the present invention, a description is made of a secure device for converting a protection format of contents data to be loaded in response to a mounted information processing terminal.

Figure 22:
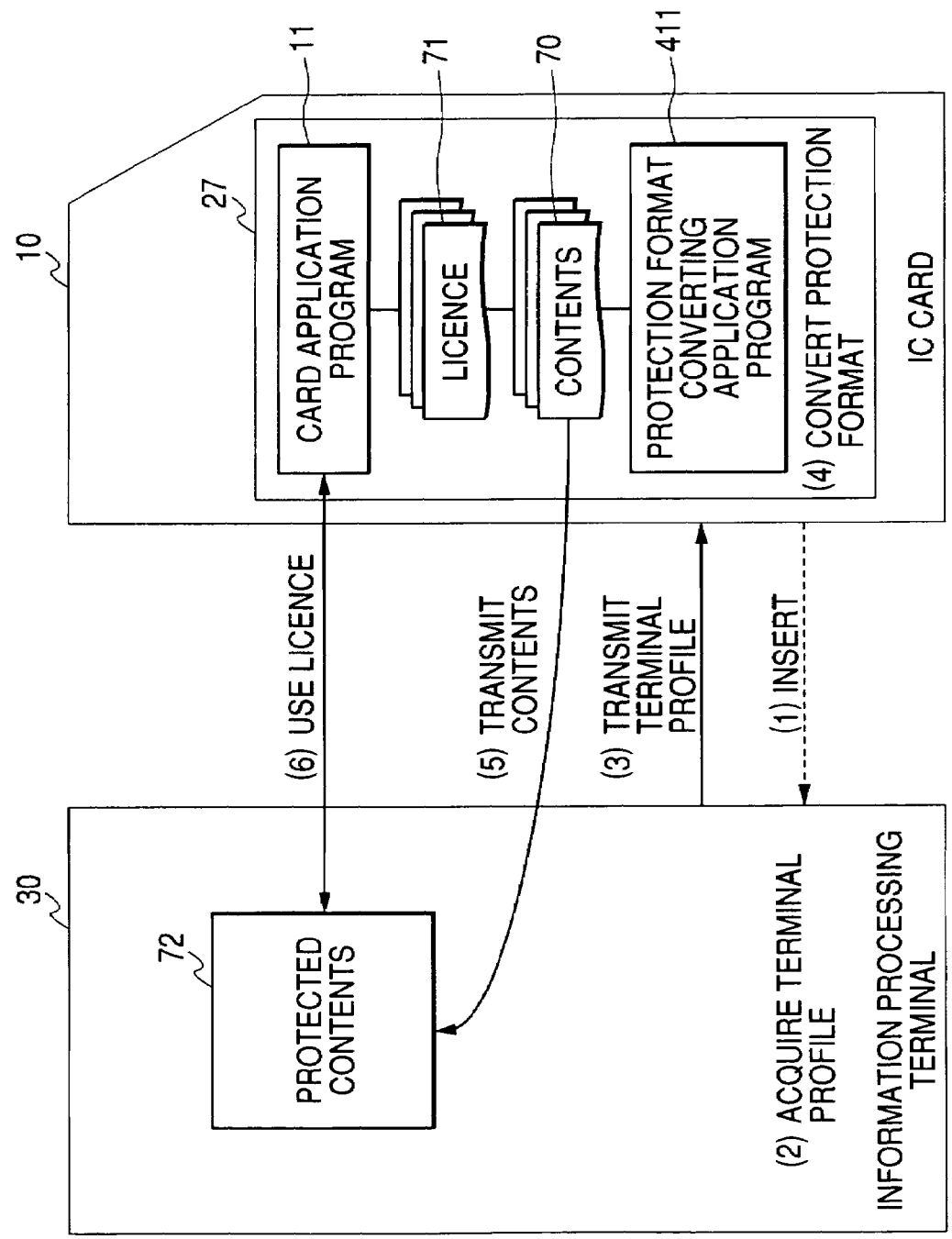
FIG. 22 is a diagram for schematically representing a process sequential operation executed between a secure device and an information processing terminal, according to a third embodiment mode of the present invention.

FIG. 22 illustratively and roughly shows a sequential operation executed when contents data protected in the information processing terminal 30 is loaded from the IC card 10 (secure device).

This IC card 10 contains a plurality of contents data 70, a plurality of licenses 71 corresponding to the plural contents data 70, a protection format converting application program 411, and a card application program 11 for using a license.

When the IC card 10 is inserted into the information processing terminal 30 (1), the information processing terminal 30 which has detected loading of the IC card 10 acquires a terminal profile (2), and then transmits the acquired terminal profile to the IC card 10 (3). This terminal profile contains such information as a machine sort and an empty storage capacity of a memory. The protection format converting application program 411 converts a protection format into such a protection format which may be adapted to the information processing terminal 30 (4), encrypts the contents data, and then transmits the protected contents data 72 to the information processing terminal 30 (5). After the protected contents data 72 is loaded to the information processing terminal 30, the card application program 11 transmits such an encrypt key which has encrypted the contents data based upon the license 71 to the information processing terminal 30, so that the contents data can be reproduced.

Figure 23:
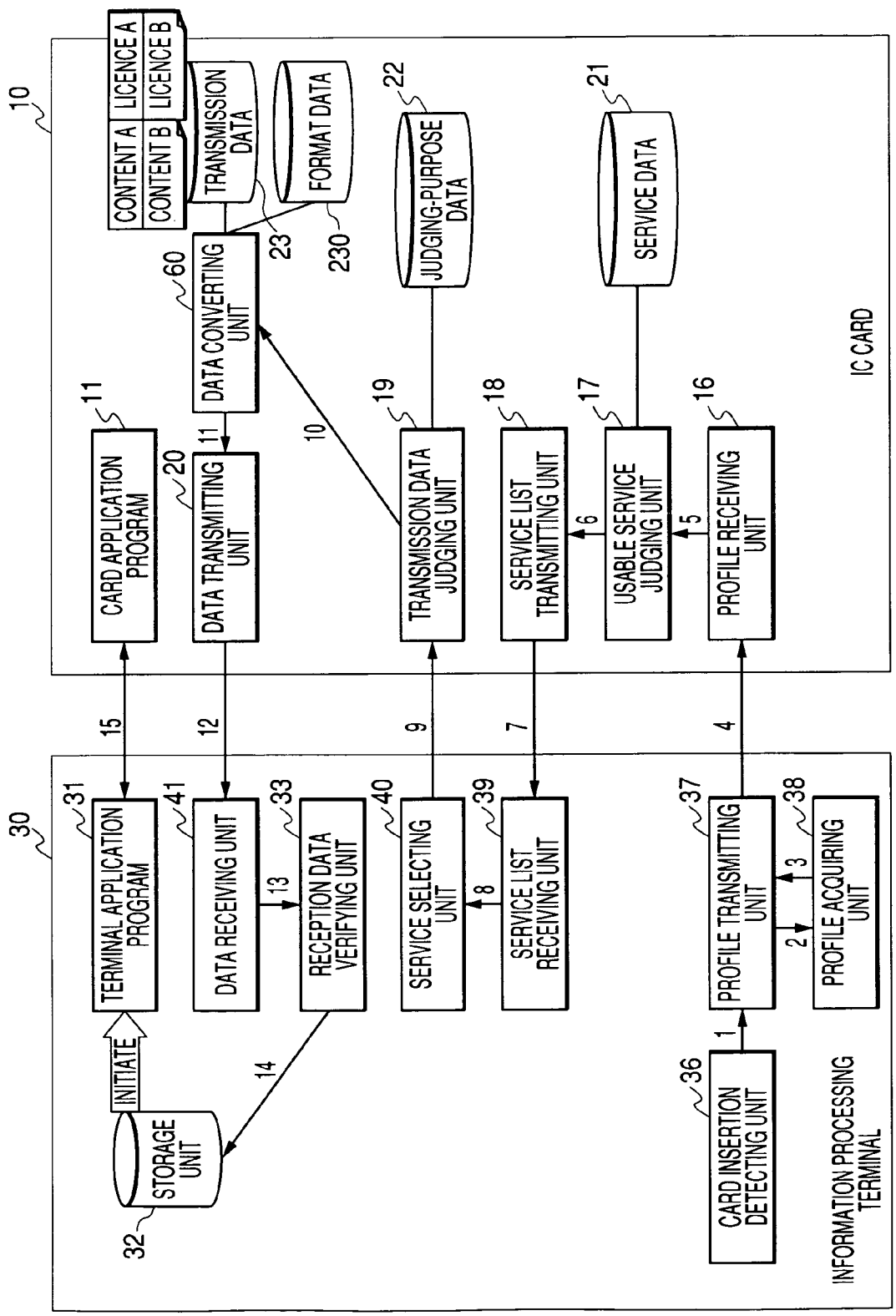
FIG. 23 is a diagram for showing a functional block as to the secure device and the information processing terminal, in the third embodiment mode of the present invention.

FIG. 23 shows both an arrangement of this IC card 10 and an arrangement of the information processing terminal 30 by way of a function block. The IC card 10 contains the card application program 11, the service data 21, the judging-purpose data 22, transmission data 23, and format data 230. The transmission data 23 contains both a plurality of contents data and a plurality of licenses corresponding to the plural contents data. The format data 230 is related to a protection format of contents data. Also, the IC card 10 is equipped with a profile receiving unit 16, a usable service judging unit 17, a service list transmitting unit 18, a transmission data judging unit 19, a data converting unit 60, and a data transmitting unit 20. The profile receiving unit 16 receives a terminal profile from the information processing terminal 30. The data converting unit 60 encrypts the contents data based upon the format data 230. The data transmitting unit 20 transmits the contents data protected by the data converting unit 60 to the information processing terminal 30.

On the other hand, the information processing terminal 30 is equipped with a card insertion detecting unit 36, a profile acquiring unit 38, a profile transmitting unit 37, a service list receiving unit 39, a service selecting unit 40, a data receiving unit 41, a reception data verifying unit 33, and a storage unit 32. The card insertion detecting unit 36 detects an insertion of the IC card 10. The profile acquiring unit 38 acquires a terminal profile of the information processing terminal 30. The profile transmitting unit 37 transmits this acquired terminal profile to the IC card 10. The service list receiving unit 39 receives a service list from the IC card 10. The service selecting unit 40 selects a service from the received service list. The data receiving unit 41 receives the protected contents data transmitted from the IC card 10. The storage unit 32 stores thereinto contents data.

When the card insertion detecting unit 36 of the information processing terminal 30 detects an insertion of the IC card 10, the card insertion detecting unit 36 informs this card insertion to the profile transmitting unit 37 (1). When the card insertion is informed to the profile transmitting unit 37, this profile transmitting unit 37 requests the profile acquiring unit 38 to acquire a terminal profile (2). Then, the profile acquiring unit 38 acquires the terminal profile, and then, returns the acquired terminal profile to the profile transmitting unit 37 (3).

The terminal profile corresponds to information as to the information processing terminal 30. In this third embodiment mode, this terminal profile is assumed as such an information related to a machine sort (A, B, C: for example, in case that information processing terminal is portable telephone, this terminal profile corresponds to information indicative of portable telephone carrier), a model number (ABC-01, BCD-04, CDE-07), an empty storage capacity of a terminal, and a protection format.

When the profile transmitting unit 37 receives the terminal profile, the profile transmitting unit 37 transmits the received terminal profile to the profile receiving unit 16 of the IC card 10 (4). The profile receiving unit 16 passes the received terminal profile to the usable service judging unit 17 (5). The usable service judging unit 17 selects a list of services which can be used in the information processing terminal 30 by employing the terminal profile and the service data 21, and then, passes the selected service list to the service list transmitting unit 18 (6). At this time, the service list corresponds to a list of usable contents.

The service list transmitting unit 18 transmits the service list to the service list receiving unit 39 of the information processing terminal 30 (7). The service list receiving unit 39 passes the service list to the service selecting unit 40 (8). The service selecting unit 40 selects a service, and then, transmits the selected service information to the transmission data judging unit 19 of the IC card 10 (9). At this time, the service selecting unit 40 may alternatively display the service list on the screen of the information processing terminal 30, so that the user may select the service. When the transmission data judging unit 19 receives the service information, the transmission data judging unit 19 judges such a contents data which should be transmitted to the information processing terminal 30 by employing the judging-purpose data 22, and then, transfers the judged contents data to the data converting unit 60 (10).

The data converting unit 60 obtains such a contents data which should be transmitted from the transmission data 23, and then, converts this contents data into such a contents data in the protection format adapted to an information processing terminal by employing both information of a terminal profile and the format data 230. The data transmitting unit 20 receives the converted data from the data converting unit 60 (11), and then, transmits this received data to the data receiving unit 41 of the information processing terminal 30 (12). The data receiving unit 41 transfers the received data to the reception data verifying unit 33 (13).

The reception data verifying unit 33 verifies the received data, and causes the verified data to be stored in the storage unit 32 (14). The terminal application program 31 (player) is initiated, and is communicated with the card application program 11, and then, contents encryption key data is obtained (15), so that the reproducing operation of contents data is carried out.

Figure 24:
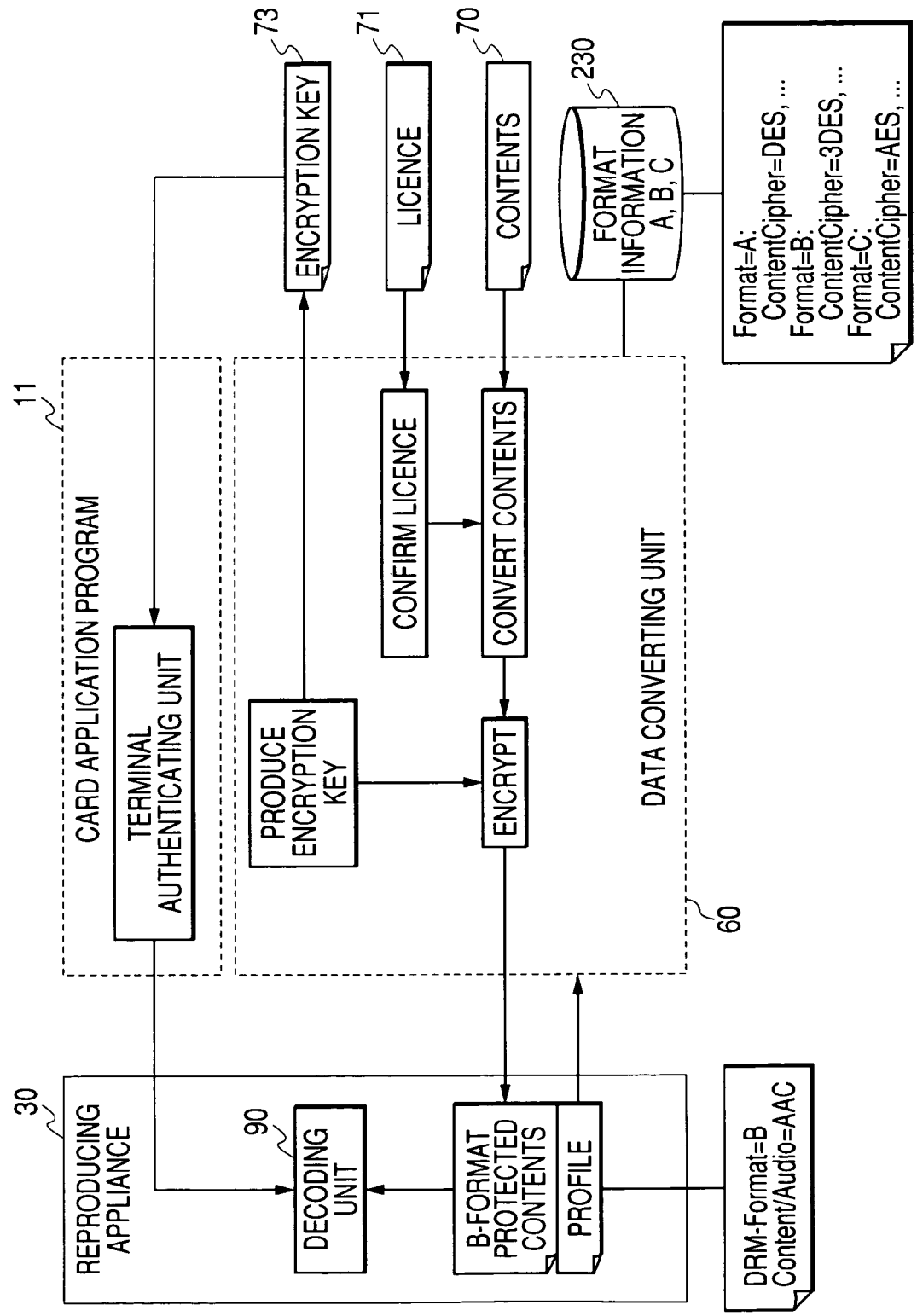
FIG. 24 is a first explanatory diagram for explaining a detailed converting operation of a protection format of contents data which is loaded.

FIG. 24 is an explanatory diagram for explaining a detailed converting operation of a protecting format for contents data which is loaded. An encryption key used to encrypt the contents data is produced within the data converting unit 60 of the IC card 10. After the data converting unit 60 executes a confirming operation of a license and a converting operation of the contents data, this data converting unit 60 loads the encrypted contents data to the information processing terminal 30 corresponding to a reproducing appliance. In this case, the data converting unit 60 loads the contents data which has been protected by a DRM (Digital Rights Management) format in correspondence with the information processing terminal 30, namely by the B format, to this information processing terminal 30. An encryption key 73 is transmitted to the information processing terminal 30 after a predetermined authenticating operation has been carried out with respect to this encryption key based upon the card application program 11 which is capable of communicating to the terminal application program of the information processing terminal 30. A decoding unit 90 of the information processing terminal 30 decodes the acquired encryption key 73, so that the contents data is reproduced by using this decoded encryption key 73.

As previously explained, in accordance with both the secure device and the information processing terminal of the third embodiment mode of the present invention, the contents data may be protected by way of the protection format in correspondence with an information processing terminal to be mounted. As a result, the license can be confirmed and updated in a safety manner. While the contents, the license, and the protection format are not leaked, the contents data can be loaded. Also, the application program can be utilized by each of the plural information processing terminals which employ the different protection formats from each other since the application program is transmitted via the secure device.

In the above-explained third embodiment mode, the description has been made of such a case that the IC card is employed as the secure device. Alternatively, similar to the first embodiment mode, a secure memory card may be employed. In this alternative case, such a protection format of contents data having a larger storage capacity may be converted.

Fourth Embodiment Mode

Next, as a fourth embodiment mode of the present invention, a description is made of another secure device for converting a protection format of contents data to be loaded in response to a mounted information processing terminal.

Figure 25:
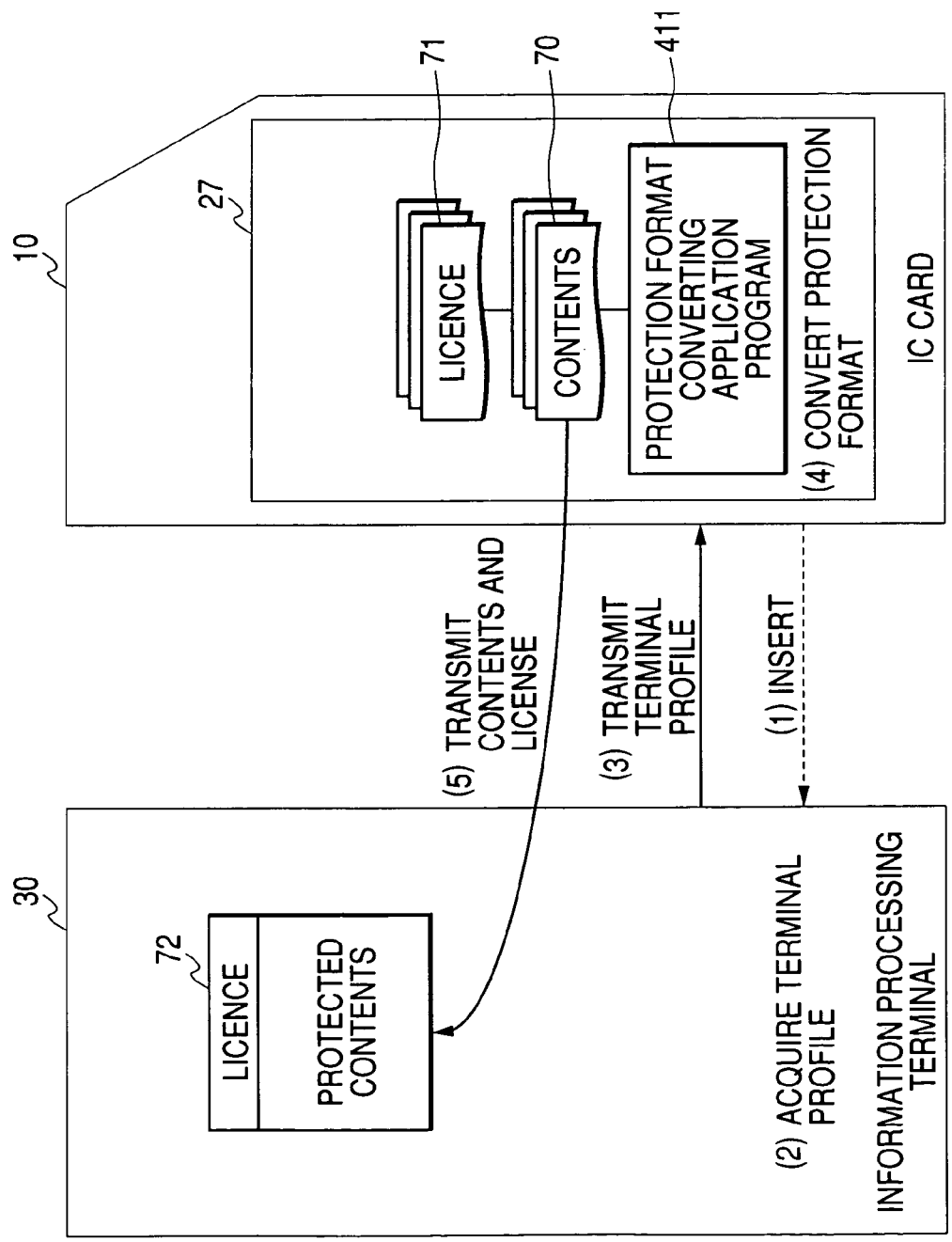
FIG. 25 is a diagram for schematically representing a process sequential operation executed between a secure device and an information processing terminal, according to a fourth embodiment mode of the present invention.

FIG. 25 illustratively and roughly shows a sequential operation executed when contents data protected in the information processing terminal 30 is loaded from the IC card 10 (secure device).

This IC card 10 contains a plurality of contents data 70, a plurality of licenses 71 corresponding to the plural contents data 70, and a protection format converting application program 411.

When the IC card 10 is inserted into the information processing terminal 30 (1), the information processing terminal 30 which has detected loading of the IC card 10 acquires a terminal profile (2), and then transmits the acquired terminal profile to the IC card 10 (3). This terminal profile contains such information as a machine sort and an empty storage capacity of a memory. The protection format converting application program 411 converts a protection format into such a protection format which may be adapted to the information processing terminal 30 (4), encrypts the contents data, and then transmits the protected contents data 72 which contains a license to the information processing terminal 30 (5). After the protected contents data 72 containing the license is loaded to the information processing terminal 30, the contents data can be reproduced.

Figure 26:
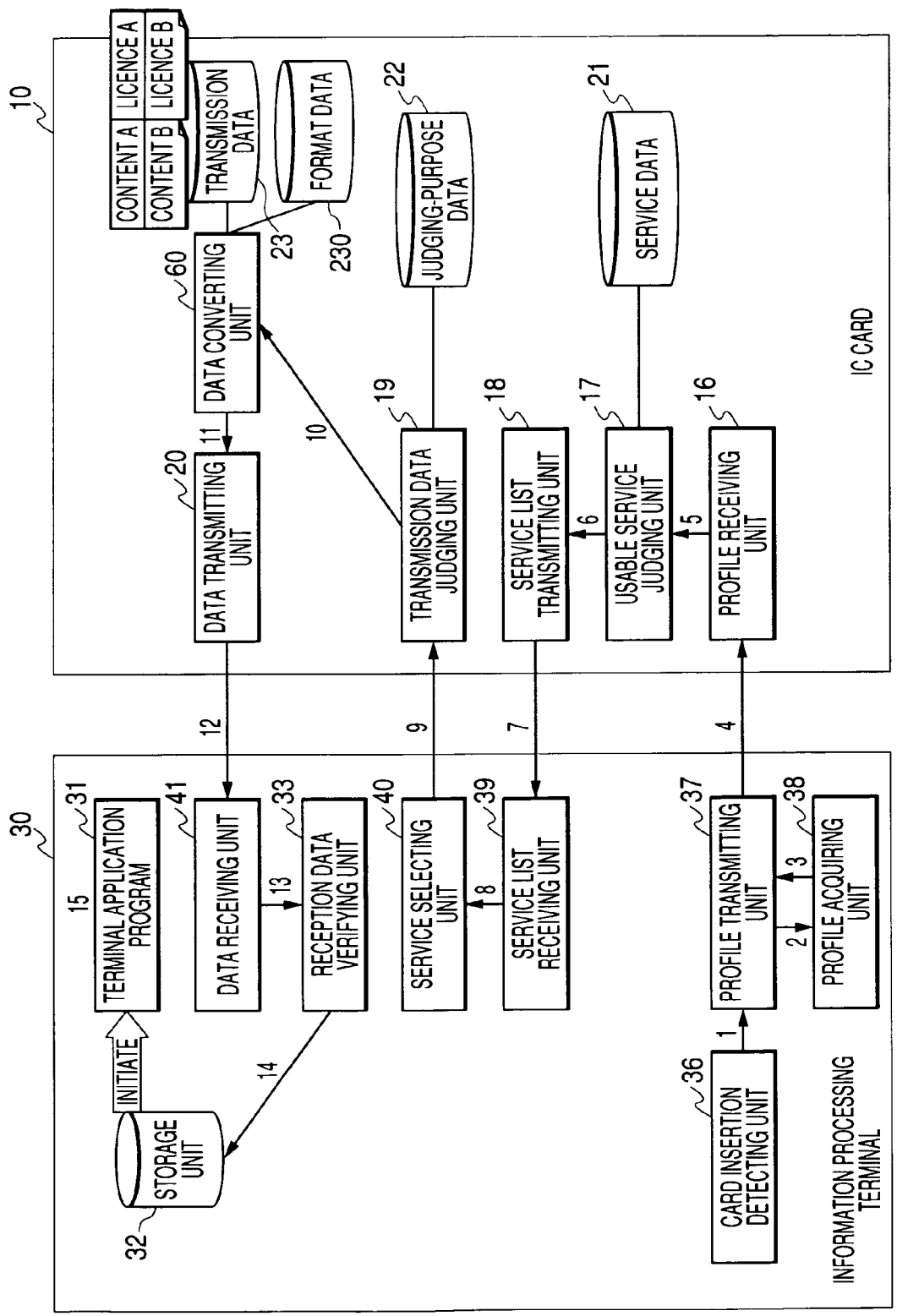
FIG. 26 is a diagram for showing a functional block as to the secure device and the information processing terminal, in the fourth embodiment mode of the present invention.

FIG. 26 shows both an arrangement of this IC card 10 and an arrangement of the information processing terminal 30 by way of a function block. The IC card 10 contains the service data 21, the judging-purpose data 22, transmission data 23, and format data 230. The transmission data 23 contains both a plurality of contents data and a plurality of licenses corresponding to the plural contents data. The format data 230 is related to a protection format of contents data. Also, the IC card 10 is equipped with a profile receiving unit 16, a usable service judging unit 17, a service list transmitting unit 18, a transmission data judging unit 19, a data converting unit 60, and a data transmitting unit 20. The profile receiving unit 16 receives a terminal profile from the information processing terminal 30. The data converting unit 60 protects the contents data based upon the format data 230. The data transmitting unit 20 transmits the contents data protected by the data converting unit 60 to the information processing terminal 30.

On the other hand, the information processing terminal 30 is equipped with a card insertion detecting unit 36, a profile acquiring unit 38, a profile transmitting unit 37, a service list receiving unit 39, a service selecting unit 40, a data receiving unit 41, a reception data verifying unit 33, and a storage unit 32. The card insertion detecting unit 36 detects an insertion of the IC card 10. The profile acquiring unit 38 acquires a terminal profile of the information processing terminal 30. The profile transmitting unit 37 transmits this acquired terminal profile to the IC card 10. The service list receiving unit 39 receives a service list from the IC card 10. The service selecting unit 40 selects a service from the received service list. The data receiving unit 41 receives the protected contents data transmitted from the IC card 10. The storage unit 32 stores thereinto contents data.

When the card insertion detecting unit 36 of the information processing terminal 30 detects an insertion of the IC card 10, the card insertion detecting unit 36 informs this card insertion to the profile transmitting unit 37 (1). When the card insertion is informed to the profile transmitting unit 37, this profile transmitting unit 37 requests the profile acquiring unit 38 to acquire a terminal profile (2). Then, the profile acquiring unit 38 acquires the terminal profile, and then, returns the acquired terminal profile to the profile transmitting unit 37 (3).

The terminal profile corresponds to information as to the information processing terminal 30. In this fourth embodiment mode, this terminal profile is assumed as such information related to a machine sort, a model number, an empty storage capacity of a terminal, and a protection format.

When the profile transmitting unit 37 receives the terminal profile, the profile transmitting unit 37 transmits the received terminal profile to the profile receiving unit 16 of the IC card 10 (4). The profile receiving unit 16 passes the received terminal profile to the usable service judging unit 17 (5). The usable service judging unit 17 selects a list of services which can be used in the information processing terminal 30 by employing the terminal profile and the service data 21, and then, passes the selected service list to the service list transmitting unit 18 (6). At this time, the service list corresponds to a list of usable contents.

The service list transmitting unit 18 transmits the service list to the service list receiving unit 39 of the information processing terminal 30 (7). The service list receiving unit 39 passes the service list to the service selecting unit 40 (8). The service selecting unit 40 selects a service, and then, transmits the selected service information to the transmission data judging unit 19 of the IC card 10 (9). At this time, the service selecting unit 40 may alternatively display the service list on the screen of the information processing terminal 30, so that the user may select the service. When the transmission data judging unit 19 receives the service information, the transmission data judging unit 19 judges such a contents data which should be transmitted to the information processing terminal 30 by employing the judging-purpose data 22, and then, transfers the judged contents data to the data converting unit 60 (10).

The data converting unit 60 obtains such a contents data which should be transmitted from the transmission data 23, and then, converts this contents data into such a contents data in the protection format adapted to an information processing terminal by employing both information of a terminal profile and the format data 230. The data transmitting unit 20 receives the converted data from the data converting unit 60 (11), and then, transmits this received data to the data receiving unit 41 of the information processing terminal 30 (12). The data receiving unit 41 transfers the received data to the reception data verifying unit 33 (13).

The reception data verifying unit 33 verifies the received data, and causes the verified data to be stored in the storage unit 32 (14). The terminal application program 31 (player) is initiated, and then, the reproducing operation of contents data is carried out (15).

Figure 27:
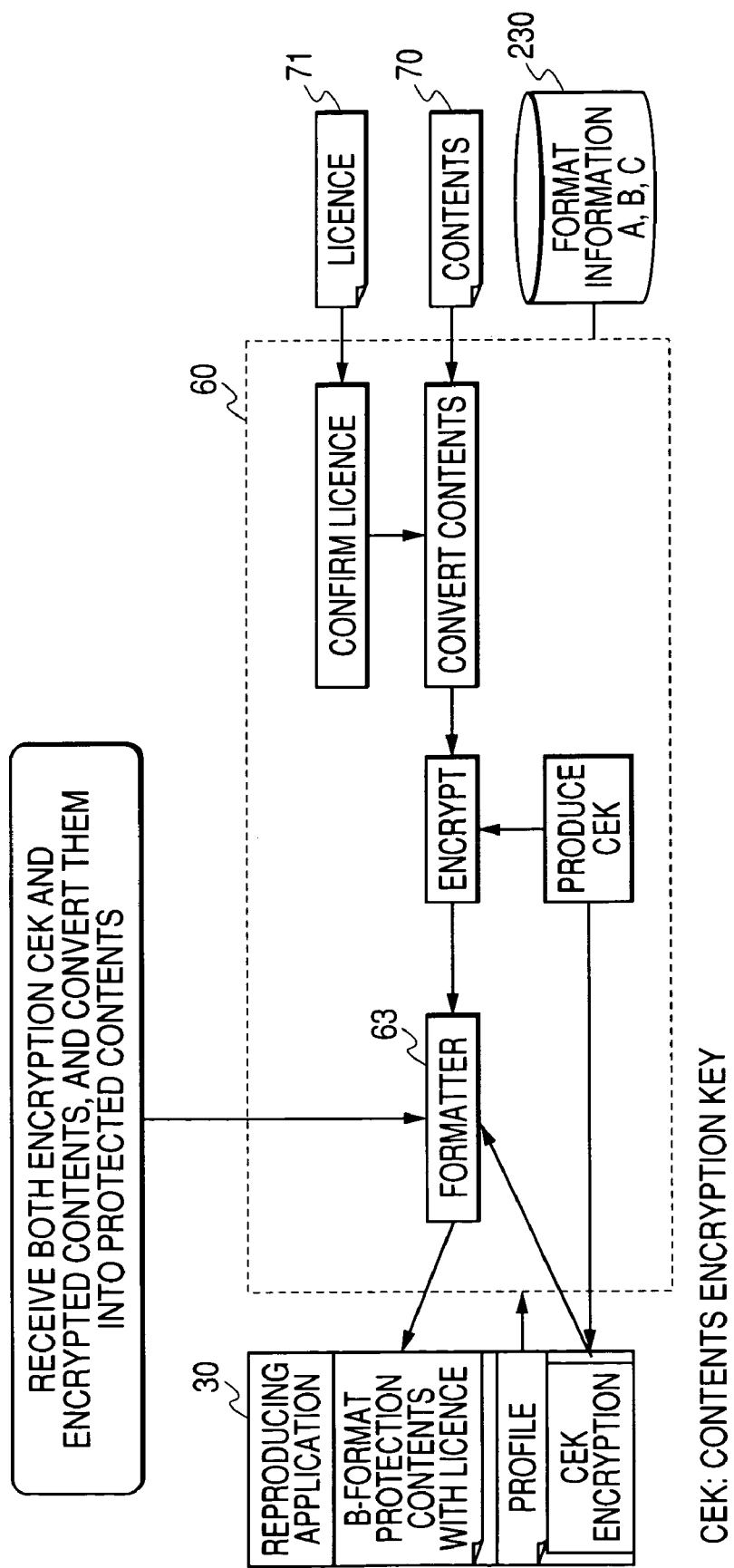
FIG. 27 is an second explanatory diagram for explaining a detailed converting operation of a protection format of contents data which is loaded.

FIG. 27 is an explanatory diagram for explaining a detailed converting operation of a protection format for contents data which is loaded. A formatter 63 of the data converting unit 60 accepts contents data, a contents encryption key (CEK: Contents Encryption Key) and a license, and then loads these accepted items as protected contents to the information processing terminal 30 corresponding to the reproducing appliance. The above-described contents data has been encrypted after a license had been confirmed and a contents converting operation had been carried out. The contents encryption key "CEK" has been encrypted by the information processing terminal 30. In this case, a license is also attached to the contents data which has been protected by the DRM (Digital Rights Management) format, namely by the B format in response to the information processing terminal 30. When the contents converting operation is carried out, the license is also converted in such a format adapted to the protection format.

As previously explained, in accordance with both the secure device and the information processing terminal of the fourth embodiment mode of the present invention, the contents data may be protected by way of the protection format in correspondence with an information processing terminal to be mounted, and such a license which is exclusively used for this information processing terminal to be mounted is applied to the contents data.

In the above-explained fourth embodiment mode, the description has been made of such a case that the IC card is employed as the secure device. Alternatively, similar to the first embodiment mode, a secure memory card may be employed. In this alternative case, such a protection format of contents data having a larger storage capacity may be converted.

Fifth Embodiment Mode

Next, as a fifth embodiment mode of the present invention, a description is made of such a secure device that data of such a protection format corresponding to an arbitrary information processing terminal is imported, the imported data is converted into data of such a protection format corresponding to another information processing terminal, and then, this converted data is exported, so that the protection format of the contents data can be converted via an IC card.

Figure 28:
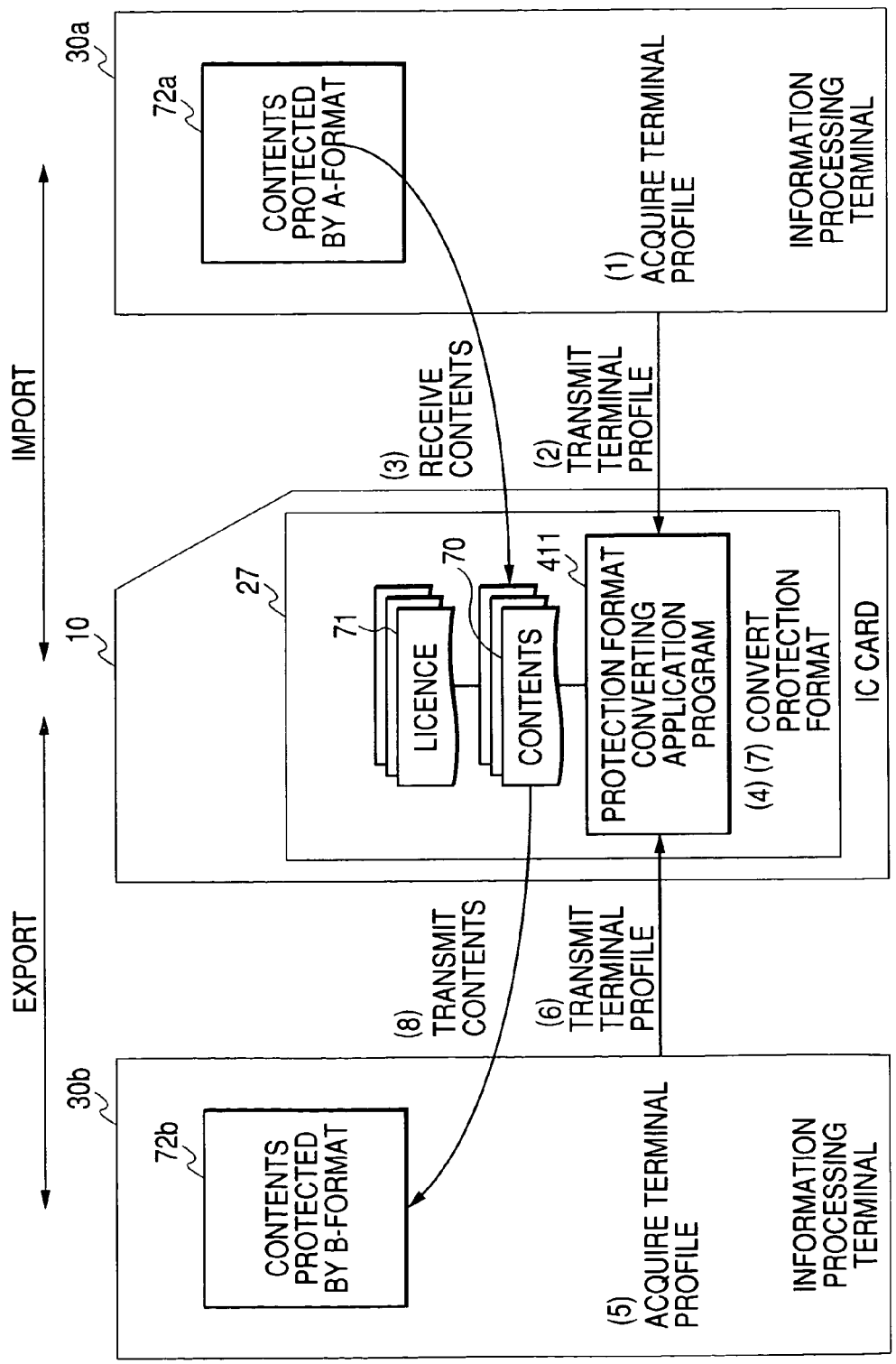
FIG. 28 is a diagram for schematically representing a process sequential operation executed between a secure device and an information processing terminal, according to a fifth embodiment mode of the present invention.

FIG. 28 illustratively and roughly shows a sequential operation executed in such a case that contents data which has been protected by a protection format of an information processing terminal 30a is imported to this IC card 10 (secure device), this imported contents data is converted into another contents data which has been protected by another protection format of another information processing terminal 30b, and then, the converted contents data is exported.

This IC card 10 contains a plurality of contents data 70, a plurality of licenses 71 corresponding to the plural contents data 70, and a protection format converting application program 411.

When the IC card 10 is inserted into the information processing terminal 30a, the information processing terminal 30a which has detected loading of the IC card 10 acquires a terminal profile (1), and then transmits the acquired terminal profile to the IC card 10 (2). This terminal profile contains such information as a machine sort and an empty storage capacity of a memory. The protection format converting application program 411 receives such a contents data which has been protected by the protection format (in this case, A format) of the information processing terminal 30a (3), and then converts the protection formats from the protection format of the information processing terminal 30a to the protection format of the IC card 10 (4).

Next, when the IC card 10 is inserted into the information processing terminal 30b, the information processing terminal 30b which has detected loading of the IC card 10 acquires a terminal profile (5), and then transmits the acquired terminal profile to the IC card 10 (6). The protection format converting application program 411 converts protection formats from the protection format of the IC card 10 to a protection format (in this case, B format) of the information processing terminal 30b (7), and then transmits the converted content data 72b to the information processing terminal 30b (8).

Figure 29:
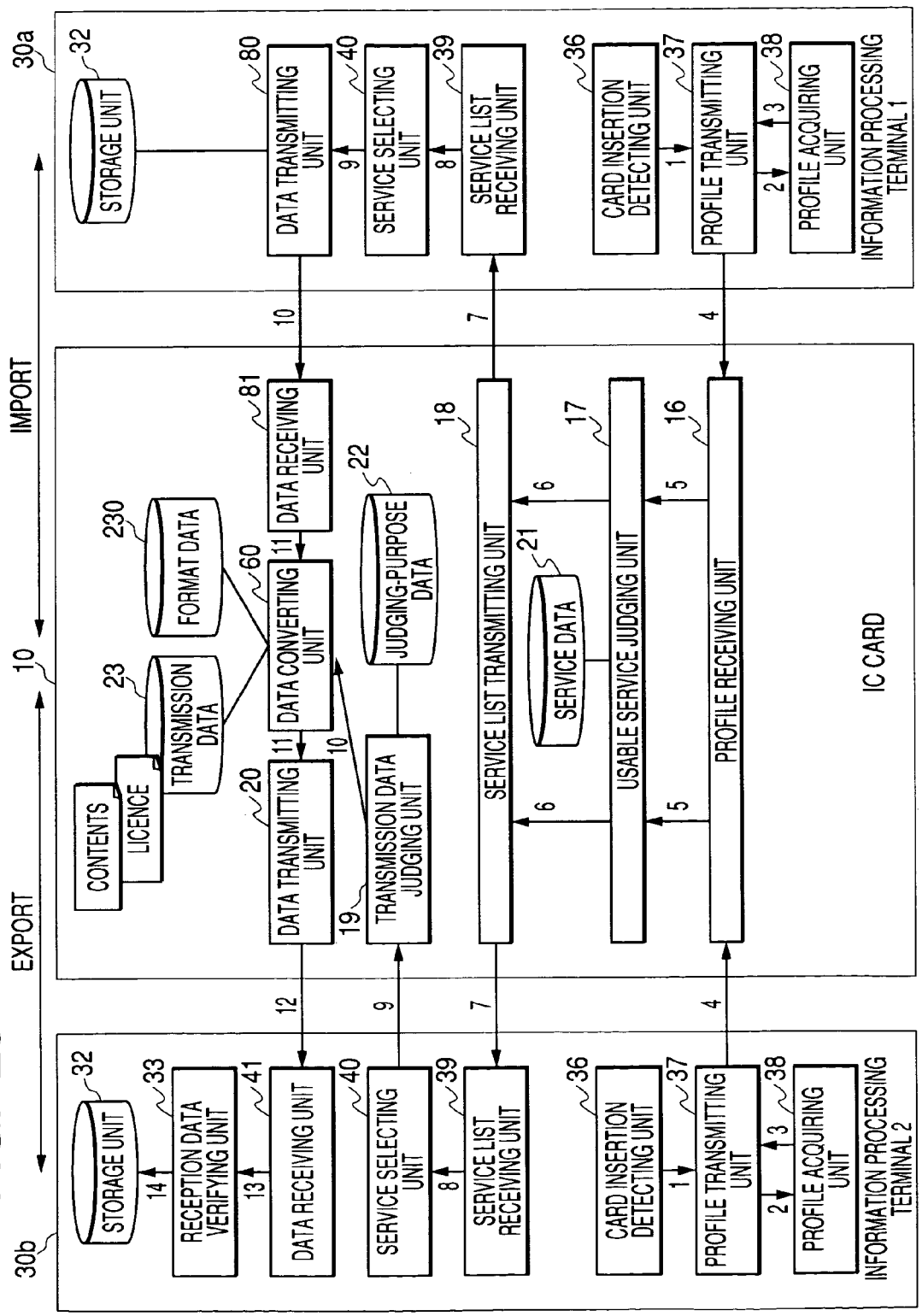
FIG. 29 is a diagram for showing a functional block as to the secure device and the information processing terminal, in the fifth embodiment mode of the present invention.

FIG. 29 shows both an arrangement of this IC card 10 and arrangements of the information processing terminals 30a and 30b by way of a function block. The IC card 10 contains the service data 21, the judging-purpose data 22, transmission data 23, and format data 230. The transmission data 23 contains both a plurality of contents data and a plurality of licenses corresponding to the plural contents data. The format data 230 is related to a protection format of contents data. Also, the IC card 10 is equipped with a profile receiving unit 16, a usable service judging unit 17, a service list transmitting unit 18, a transmission data judging unit 19, a data converting unit 60, a data transmitting unit 20, and a data receiving unit 81. The profile receiving unit 16 receives terminal profiles from the information processing terminals 30a and 30b. The data converting unit 60 encrypts the contents data based upon the format data 230. The data transmitting unit 20 transmits the contents data protected by the data converting unit 60 to the information processing terminal 30b. The data receiving unit 81 receives transmission data 23 (contents data) transmitted from the information processing terminal 30*a*.

On the other hand, the information processing terminals 30*a* and 30*b* are equipped with a card insertion detecting unit 36, a profile acquiring unit 38, a profile transmitting unit 37, a service list receiving unit 39, a service selecting unit 40, a data receiving unit 41, a data transmitting unit 80, a reception data verifying unit 33, and a storage unit 32. The card insertion detecting unit 36 detects an insertion of the IC card 10. The profile acquiring unit 38 acquires a terminal profile of the information processing terminal 30*a*, or 30*b*. The profile transmitting unit 37 transmits this acquired terminal profile to the IC card 10. The service list receiving unit 39 receives a service list from the IC card 10. The service selecting unit 40 selects a service from the received service list. The data receiving unit 41 receives the protected contents data transmitted from the IC card 10. The data transmitting unit 80 transmits the protected contents data to the IC card 10. The storage unit 32 stores thereinto the contents data.

In the beginning, an import of contents data will now be explained. When the card insertion detecting unit 36 of the information processing terminal 30*a* detects an insertion of the IC card 10, the card insertion detecting unit 36 informs this card insertion to the profile transmitting unit 37 (1). When the card insertion is informed to the profile transmitting unit 37, this profile transmitting unit 37 requests the profile acquiring unit 38 to acquire a terminal profile (2). Then, the profile acquiring unit 38 acquires the terminal profile, and then, returns the acquired terminal profile to the profile transmitting unit 37 (3). The terminal profile corresponds to information as to the information processing terminal 30*a*. In this fifth embodiment mode, this terminal profile is assumed as such information related to a machine sort, a model number, an empty storage capacity of a terminal, and a protection format.

When the profile transmitting unit 37 receives the terminal profile, the profile transmitting unit 37 transmits the received terminal profile to the profile receiving unit 16 of the IC card 10 (4). The profile receiving unit 16 passes the received terminal profile to the usable service judging unit 17 (5). The usable service judging unit 17 selects a list of contents which can be imported into the IC card 10 by employing the terminal profile and the service data 21, and then, passes the selected contents list to the service list transmitting unit 18 (6).

The service list transmitting unit 18 transmits the service list to the service list receiving unit 39 of the information processing terminal 30*a* (7). The service list receiving unit 39 passes the service list to the service selecting unit 40 (8). The service selecting unit 40 selects a service, and then, transmits the selected service information to the data transmitting unit 80 (9). At this time, the service list corresponds to a list of such contents which can be imported. The service selecting unit 40 may alternatively display this list on a screen of an information processing terminal, and then, a user may alternatively select contents. When the data transmitting unit 80 receives the service information, the data transmitting unit 80 derives contents from the storage unit 32, and then, transmits the derived contents to the data receiving unit 81 of the IC card 10 (10).

The data receiving unit 81 transfers the received contents data to the data converting unit 60 (11). The data converting unit 60 converts a protection format into such a format which is stored in the IC card 10 by employing the format data 230, and then stores the contents data having the converted format as the transmission data 23 (12).

Next, an export of contents data will now be explained. When the card insertion detecting unit 36 of the information processing terminal 30*b* detects an insertion of the IC card 10, the card insertion detecting unit 36 informs this card insertion to the profile transmitting unit 37 (1). When the card insertion is informed to the profile transmitting unit 37, this profile transmitting unit 37 requests the profile acquiring unit 38 to acquire a terminal profile (2). Then, the profile acquiring unit 38 acquires the terminal profile, and then, returns the acquired terminal profile to the profile transmitting unit 37 (3). The terminal profile corresponds to information as to the information processing terminal 30*b*. In this fifth embodiment mode, this terminal profile is assumed as such information related to a machine sort, a model number, an empty storage capacity of a terminal, and a protection format. When the profile transmitting unit 37 receives the terminal profile, the profile transmitting unit 37 transmits the received terminal profile to the profile receiving unit 16 of the IC card 10 (4).

The profile receiving unit 16 passes the received terminal profile to the usable service judging unit 17 (5). The usable service judging unit 17 selects a list of contents which can be exported from the IC card 10 by employing the terminal profile and the service data 21, and then, passes the selected contents list to the service list transmitting unit 18 (6).

Service data is arranged by a contents name and a license. In the license, permit/not permit of an export is also described in addition to a use condition. For example, in an example of the service data shown in FIG. 31, the following items are set: That is, "Song-1" can be exported to an information processing terminal which supports the DRM of the A format; if either the DRM of the A format or the DRM of the B format is supported in an information processing terminal marketed by a company "A", then "Song-2" can be exported; "Song-3" can be exported to an information processing terminal called as ABC-01 of the company A by the DRM of the C format; and also, if such a DRM other than the D format is employed in an information processing terminal of a company B, then "Movie-1" can be exported.

Next, the service list transmitting unit 18 transmits the service list to the service list receiving unit 39 of the information processing terminal 30*b* (7). The service list receiving unit 39 passes the service list to the service selecting unit 40 (8). The service selecting unit 40 selects a service, and then, transmits the selected service information to the transmission data judging unit 19 of the IC card 10 (9). At this time, the service list corresponds to a list of contents which can be exported. The service selecting unit 40 may alternatively display the service list on the screen of the information processing terminal 39, so that the user may select the service.

When the transmission data judging unit 19 receives the service information, the transmission data judging unit 19 judges such a contents data which should be transmitted to the information processing terminal 30 by employing the judging-purpose data 22, and then, transfers the judged contents data to the data converting unit 60 (10). The data converting unit 60 obtains such a contents data which should be transmitted from the transmission data 23, and then, converts this contents data into such a contents data in the protection format adapted to an information processing terminal by employing both information of a terminal profile and the format data 230 (11). The data transmitting unit 20 receives the converted data from the data converting unit 60, and then, transmits this received data to the data receiving unit 41 of the information processing terminal 30*b* (12).

The data receiving unit 41 transfers the received data to the reception data verifying unit 33 (13). The reception data verifying unit 33 verifies the received data, and causes the verified data to be stored in the storage unit 32 (14).

As the terminal profile, furthermore, information as to the owned contents information may be alternatively transferred.

Since the owned contents information is transferred, only contents which are not owned are contained in the service list, so that a service selecting operation may be easily carried out.

Figure 30:
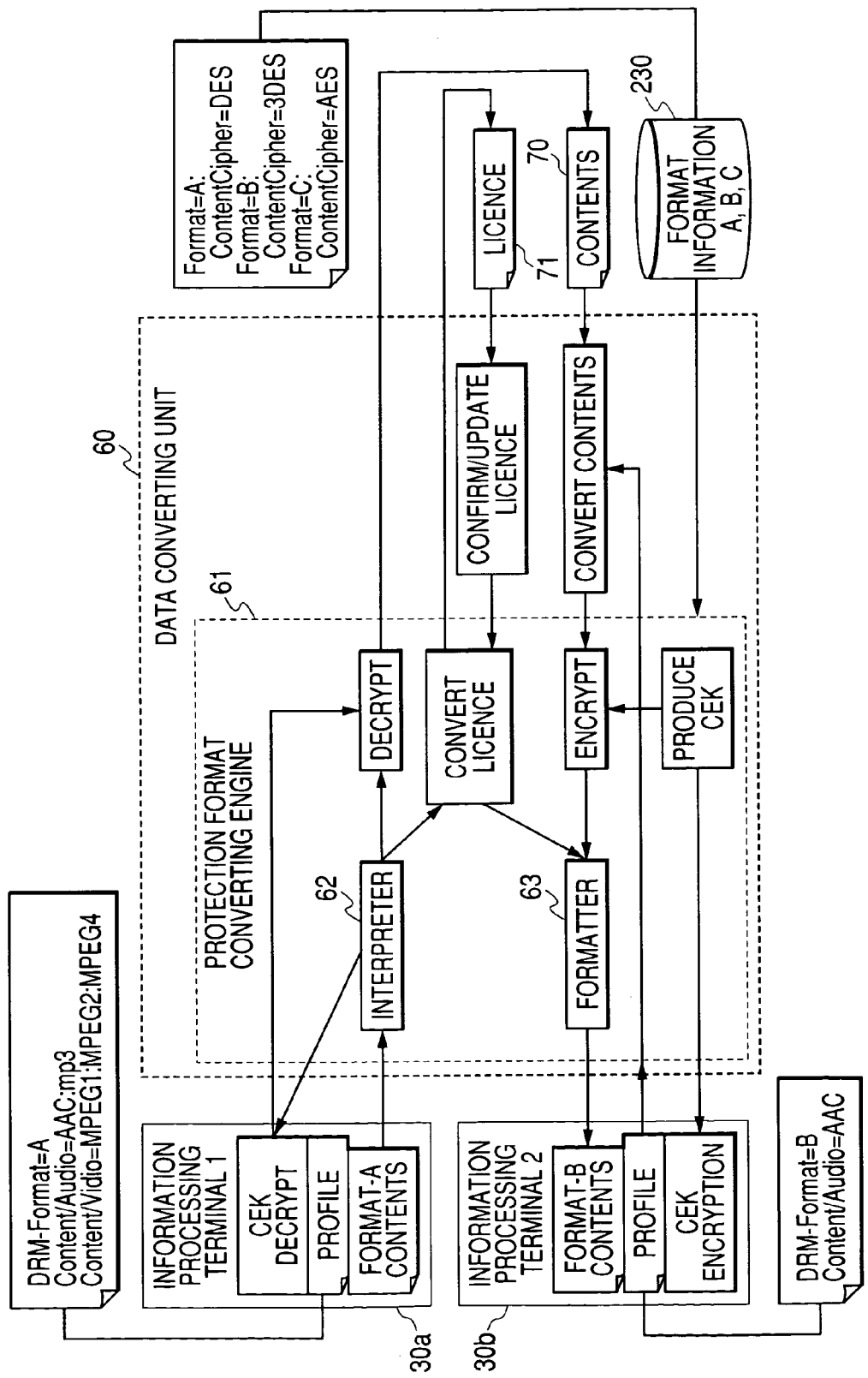
FIG. 30 is an explanatory diagram for explaining a protection format converting operation by importing and exporting contents data.

FIG. 30 is an explanatory diagram for explaining a detailed protection format converting operation by importing and exporting contents data. In a protection format converting engine 61 employed in the data converting unit 60, an interpreter 62 resolves the protected contents data which is accepted from the information processing terminal 30a into an encryption key, an encrypted content, and a license, and the formatter 63 accepts the encryption key, the encrypted content, and the license, and then, forms the protected contents based upon these encryption key, encrypted content, and license.

As previously explained, in accordance with the secure device and the information processing terminal of the fifth embodiment mode of the present invention, while the IC card is mounted and dismounted on the different information processing terminals, since the contents data is imported and exported, the contents data which has been protected by a predetermined protection format is converted into such a contents data having the different protection format, so that the contents can be moved between the information processing terminals having the different protection formats.

In the above-explained fifth embodiment mode, the description has been made of such a case that the IC card is employed as the secure device. Alternatively, similar to the first embodiment mode, a secure memory card may be employed. In this alternative case, the protection format of the contents data having a larger storage capacity can be converted.

As previously explained, the information processing device of the present invention can own such an effect that the information processing device can be executed by the information processing terminal in an easy manner, while the user need not perform the operation for acquiring the application program from the external source. The information processing device of the present invention may be applied to various sorts of information processing device which are used in various sorts of information processing terminals, for example, a portable telephone, a portable information terminal (PDA), a personal computer, a music reproducing (and recording) device, a camera, a video camera, an automatic cash dispenser, a street-installed terminal, a settlement terminal, and the like.

What is claimed is:

1. An information processing device for responding to a request for a service issued from an information processing terminal selected be a user of said information processing terminal from a list of usable services, said information processing device comprising:
    a processor;
    a usable service judging unit for determining services that are usable with services issued from the information processing terminal for providing the list of usable services to the user;
    a retaining unit for retaining both a first application program and a second application program; and
    a transmission unit for transmitting said first application program to said information processing terminal in response to said request, wherein
    said information processing terminal executing said first application program for use by said terminal for providing one of said usable services and for interacting with said second application program executing concurrently on said processor or said information processing device, said interacting in support of providing said one at said usable services to the user at said information processing terminal, wherein
    said information processing device to be used by other information processing terminals for providing a different list of usable services.

2. The information processing device as claimed in claim 1, wherein, when said information processing device is mounted on said information processing terminal, said transmission unit transmits said first application program.

3. The information processing device as claimed in claim 2, wherein said transmission unit selects the first application program to be transmitted in response to a condition.

4. The information processing device as claimed in claim 3, wherein said transmission unit selects the first application program to be transmitted in response to said information processing terminal.

5. The information processing device as claimed in claim 4, wherein said transmission unit selects the first application program to be transmitted in response to a terminal profile acquired from said information processing terminal.

6. The information processing device as claimed in claim 5, wherein said transmission unit selects the first application program to be transmitted in response to machine sort information which is contained in said terminal profile.

7. The information processing device as claimed in claim 5, wherein said transmission unit selects the first application program to be transmitted in response to an empty storage capacity which is contained in said terminal profile.

8. The information processing device as claimed in claim 5, wherein said transmission unit selects the first application program to be transmitted in response to presence/absence of a license related to said first application program.

9. The information processing device as claimed in claim 8, wherein said transmission unit selects the first application program to be transmitted in response to an input of a license code related to said first application program.

10. The information processing device as claimed in claim 2, wherein said information processing device further includes providing means for selecting from a list of process operations provided on said information processing terminal, wherein said list indicates process operations which can be executed by using a resource or said information processing terminal, and wherein, when said information processing device is mounted on said information processing terminal, said transmission unit selects such a first application program used to execute a process operation selected from said list.

11. The information processing device as claimed in claim 1, wherein said transmission unit transmits information as to an acquisition destination for acquiring a latest version of said first application program to said information processing terminal in combination with said first application program.

12. The information processing device as claimed in claim 8 or 9, further comprising: conversion means for converting a protection format of the selected contents data based upon said terminal profile, wherein said transmission unit transmits the converted contents data.

13. The information processing device as claimed in claim 1, wherein said retaining unit retains data which is used by said first application program, and wherein said transmission unit transmits the data which is used by the first application program in combination with said first application program.

14. The information processing device as claimed in claim 1, further comprising: reception means for receiving contents data and a terminal profile from the information processing terminal; conversion means for detecting a protection format of the received contents data based upon the terminal profile and converting the protection format into a predetermined protection format; and storing means for storing thereinto the converted contents data.

15. An information processing system comprising:

A plurality of different information processing terminals each providing a different set usable services no a user; and an information processing device which is adapted for interacting with said information processing terminals when said device is mounted on any one of said terminals, wherein said information processing device includes:
a processor,
a usable service judging unit for determining a list of services that are usable with services issued from any one at said terminals mounted by said information processing device for providing the list of services to the user;
a retaining unit for retaining a plurality of first application programs, each one of which is for causing a respective one or said information processing terminals to execute a first process operation, and for retaining at least one second application program for causing said processor to execute a second process operation interacting with said first process operation executed on the terminal in mounted by said information processing device; and
a transmission unit for transmitting one of said first application program to said one of said terminals in response to a request for a service selected by the user from the list of services, said one of said first application programs for use by the terminal for providing the selected one of said services;

and wherein each one of said information processing terminals includes:
an interface for receiving requested service requests from a user;
a requesting unit for providing said service requests to said information processing device to acquire said one of said first application programs from said information processing device mounted by said terminal;
an acquisition unit for acquiring said one of said first application programs which is transmitted from said transmission unit in response to said request;
a storage unit for storing thereinto the acquired one of said first application programs;
a processor for executing said one of said first application programs for performing said first process operation;
wherein said selected one of said services is provided by said first process operation interacting concurrently with said second process operation.

16. The information processing system of claim 15, wherein said information processing device is adapted for inserting into/pulling out of said information processing terminal and wherein said information processing terminal interacts with said information processing device when said device is inserted into said terminal.

17. A secure processing device for responding to a request for a service selected from a list of usable services that can be issued from an information processing terminal, said secure processing device comprising:
a usable service judging unit for determining services that are usable with services issued from the information processing terminal for providing the list of usable services;
a retaining unit for retaining a plurality of application programs for causing said information processing terminal to execute a corresponding process operation interacting with said secure processing device, and an authentication data used in the interaction with said process operation executed on the information processing terminal;
a judgment unit for selecting at least one application program from said plurality of application programs based on a user request for a service of said information processing terminal;
a transmission unit for transmitting the selected at least one of said application programs to said information processing terminal in response to said request; and
an interaction unit for interacting with said process operation executing on the information processing terminal, wherein
said at least one application program executed by said information processing terminal while concurrently interacting with said interaction unit to perform the requested service for the user, and wherein
said secure processing device to be used by other information processing terminals for providing a different list of usable services.

18. An information processing system comprising:
an information processing terminal;
an IC card including a processor, a usable service judging unit, a retaining unit, and an interface for interfacing with said information processing terminal, said retaining unit for storing a plurality of terminal application programs, wherein
said information processing terminal provides said IC card with a terminal profile identifying said information processing terminal in response to said information processing terminal directly interfacing with said IC card,
said usable service judging unit uses said terminal profile in combination with functions issued from one or more of said terminal application programs for determining services that are usable with services issued from the information processing terminal for providing a list of usable services, and wherein
said system presents a user with the list of usable services in response to said interfacing, and further wherein
in response to the user selecting one of said usable services, said IC card transmits one of said terminal application programs to said information processing terminal based on the selected one of said services, and still further wherein
said information processing terminal executes said transmitted one of said terminal application programs for use by said terminal for providing the selected one of said usable services and while concurrently interacting with a program running on said IC card processor for providing said selected one of said usable services to the user, wherein
said IC card is adapted for use by other information processing terminals providing a different list of usable services.

19. The system of claim 18, wherein said list of services are based on the terminal application programs stored on said IC card, and wherein said list is provided by said IC card and displayed to the user by said information processing terminal.

20. The system of claim 18, wherein said terminal profile includes data about a type of said information processing terminal and wherein said transmitted one of said terminal application programs is chosen based on said type and wherein said one of said terminal application programs is adapted for execution on said type of said information processing terminal.

* * * * *

UNITED STATES PATENT AND TRADEMARK OFFICE
CERTIFICATE OF CORRECTION

PATENT NO.       : 7,600,228 B2                                              Page 1 of 1
APPLICATION NO.  : 10/890631
DATED            : October 6, 2009
INVENTOR(S)      : Hiroshi Takekawa et al.

It is certified that error appears in the above-identified patent and that said Letters Patent is hereby corrected as shown below:

In Column 27, line 47, please delete "be" and insert therefor --by--.

In Column 27, line 66, please delete "at" and insert therefor --of--.

In Column 28, line 40, please delete "or" and insert therefor --of--.

In Column 29, line 3, please delete "no" and insert therefor --to--.

In Column 29, line 43, please insert --and-- after the word "programs;".

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,600,228 B2
APPLICATION NO. : 10/890631
DATED : October 6, 2009
INVENTOR(S) : Takekawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Fifth Day of October, 2010

David J. Kappos
*Director of the United States Patent and Trademark Office*